(12) United States Patent
Maki et al.

(10) Patent No.: US 12,375,775 B2
(45) Date of Patent: Jul. 29, 2025

(54) INFORMATION PROCESSING APPARATUS AND CONTROL METHOD

(71) Applicant: Lenovo (Singapore) Pte. Ltd., Singapore (SG)

(72) Inventors: Koutaroh Maki, Kanagawa (JP); Shohei Koyama, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 308 days.

(21) Appl. No.: 17/944,366

(22) Filed: Sep. 14, 2022

(65) Prior Publication Data

US 2023/0117886 A1 Apr. 20, 2023

(30) Foreign Application Priority Data

Oct. 19, 2021 (JP) .................................. 2021-170983

(51) Int. Cl.
- *H04N 21/488* (2011.01)
- *H04N 21/431* (2011.01)
- *H04N 21/858* (2011.01)

(52) U.S. Cl.
CPC ..... *H04N 21/4884* (2013.01); *H04N 21/4312* (2013.01); *H04N 21/8586* (2013.01)

(58) Field of Classification Search
CPC ........... H04N 21/4884; H04N 21/4312; H04N 21/8586
See application file for complete search history.

(56) References Cited

U.S. PATENT DOCUMENTS

| | | | | |
|---|---|---|---|---|
| 5,739,850 A | * | 4/1998 | Hori | H04N 5/772 386/E5.072 |
| 2002/0118952 A1 | * | 8/2002 | Nakajima | H04N 21/8153 348/E5.007 |
| 2013/0198642 A1 | * | 8/2013 | Carney | H04N 21/6587 715/738 |
| 2016/0360279 A1 | * | 12/2016 | Batmanglidj | H04N 21/4882 |

FOREIGN PATENT DOCUMENTS

| | | |
|---|---|---|
| JP | 2008017050 A | 1/2008 |
| JP | 2013115457 A | 6/2013 |
| JP | 2019-61594 A | 4/2019 |

* cited by examiner

*Primary Examiner* — Thai Q Tran
*Assistant Examiner* — Jose M Mesa
(74) *Attorney, Agent, or Firm* — Osha Bergman Watanabe & Burton LLP

(57) ABSTRACT

An information processing apparatus includes a memory that temporarily stores video data received from another information processing apparatus via a network, and a processor that executes processing based on the video data stored in the memory. The processor performs capture processing of capturing a screen area of a display unit configured to display video of the video data received from the other information processing apparatus and stored in the memory, the captured screen area including at least a part of the video, the capture processing capturing the screen area that is a still image file at predetermined time intervals; and while continuing the capturing at predetermined time intervals by the capture processing, character information acquisition processing of acquiring character information that is recognized as characters and is acquired from at least a part of the images of a series of still image files captured by the capture processing.

21 Claims, 15 Drawing Sheets

| File Name | Time Stamp | Review Target |
|---|---|---|
| 2020-11-02-18-54-22.png | Nov. 2, 2020 18:54:22 | 1 |
| 2020-11-02-18-54-32.png | Nov. 2, 2020 18:54:32 | 1 |
| 2020-11-02-18-54-42.png | Nov. 2, 2020 18:54:42 | 0 |
| 2020-11-02-18-54-52.png | Nov. 2, 2020 18:54:52 | 1 |
| 2020-11-02-18-55-02.png | Nov. 2, 2020 18:55:02 | 0 |
| ⋮ | ⋮ | ⋮ |

FIG. 7

| File Name | Text | Position |
|---|---|---|
| 2020-11-02-18-54-32.png | Understanding | (x1, y1) |
| | integrity | (x2, y2) |
| | ⋮ | ⋮ |
| ⋮ | ⋮ | ⋮ |

FIG. 8

| File Name | Elapsed Time | Text |
|---|---|---|
| movie001.mp4 | 00:00:00 | Agenda He Talk · · · · · · · · · · · · |
| | 00:00:45 | Smarter technology for · · · · · · · · · · · |
| | ⋮ | ⋮ |
| | 00:18:25 | Intelligent Transformat · · · · · · · · · · · <br> Smart IoT 3S J · · · · · · · · · · · |
| | 00:19:10 | 3SU%TOne Hege we · · · · |
| | 00:19:50 | GROW · · · · · · · · · · · , <br> NW Cloud Service Provide · · · · · · · |
| | ⋮ | ⋮ |

Rows 00:18:25 through 00:19:10 are bracketed as TH.

| 11 | User A : Any things of |
| 12 | User A : Uh and this |
| 13 | User A : to fill in the |
| 14 | User A : is valuable and |
| 15 | User A : triage on a regular |
| 16 | User A : wemeet through this |
| 17 | User A : questions, look at |
| 18 | User A : Any questions |
| 19 | User D : So these are all |
| 20 | User B : or. |
| 21 | User A : User 3, I think |
| 22 | User C : Yes and that' s why |
| 23 | User C : main agenda for |
| 24 | User C : hava a clear idea |
| 25 | User C : screen of crash |
| 26 | User C : A more than |

FIG. 20

INFORMATION PROCESSING APPARATUS AND CONTROL METHOD

CROSS-REFERENCE TO RELATED APPLICATIONS

This application claims priority to Japanese Patent Application No. 2021-170983 filed on Oct. 19, 2021, the contents of which are hereby incorporated herein by reference in their entirety.

BACKGROUND OF THE INVENTION

Field of the Invention

The present invention relates to an information processing apparatus and a control method.

Description of the Related Art

Applications for online video conferencing over the network are available. Such an application not only sends and receives the user's video and audio to and from the information processing apparatuses used by the users participating in the video conference, but also has the function of sharing the screen on which a material on the conference is displayed among all of the information processing apparatuses so that the participants can view it (for example, Japanese Unexamined Patent Application Publication No. 2019-61594).

Using the above-mentioned application, the presenter explains to other participants while sharing the screen on which a material or the like is displayed. Inconveniently, the shared material is displayed as video to the participants, and if a participant may want to look up for or use elsewhere some of the words, characters, or sentences described in the material, they have to type them each time.

SUMMARY OF THE INVENTION

One or more embodiments of the present invention provide an information processing apparatus, and a control method capable of enhancing the convenience of online video conference.

The first aspect of the present invention relates to an information processing apparatus including: a memory that temporarily stores video data received from another information processing apparatus via a network; and a processor configured to execute processing based on the video data stored in the memory. The processor performs capture processing of capturing a screen area of a display unit configured to display video of the video data received from the other information processing apparatus and stored in the memory, the captured screen area including at least a part of the video, the capture processing capturing the screen area that is a still image file at predetermined time intervals; and while continuing capturing at the predetermined time intervals by the capture processing, character information acquisition processing of acquiring character information that is recognized as characters and is acquired from at least a part of the images of a series of still image files captured by the capture processing, and storing the character information for each image.

In the information processing apparatus, while continuing capturing at the predetermined time intervals by the capture processing, the processor further performs display control processing of displaying the part of images, which are associated with the character information, on the display unit.

In one aspect of the present disclosure, in the character information acquisition processing, the processor acquires, as the character information, character data of characters recognized from the at least a part of the images and position data of the location where the characters are recognized, and in the display control processing, when displaying the at least a part of the images on the display unit in association with the character information, the processor displays a position in the image where the characters are recognized in a specific display mode.

In the information processing apparatus, the processor performs provisioning processing of providing the recognized characters in accordance with user's operation at the position where the characters are recognized in the image displayed on the display unit by the display control processing.

In the provisioning processing, the processor provides the recognized characters to be copiable.

In the provisioning processing, the processor provides the recognized characters to be searchable by a browser.

In the provisioning processing, when the recognized characters indicate a uniform resource locator (URL), the processor provides a resource identified by the URL to be displayable on the display unit.

In the display control processing, the processor displays a user interface on the display unit that allows selection of each of a series of still image files captured by the capture processing corresponding to the captured order, and displays, on the display unit, an image of a still image file selected in response to user's operation with the user interface.

In the capture processing, the processor captures a specific area in the video within the screen area of the display unit.

Each time the capture processing conducts capture, the processor further performs similarity determination processing of comparing an image of a still image file captured this time with an image of a still image file captured previously to determine a similarity, and the processor excludes an image of a still image file whose similarity to an image of a still image file captured previously is determined by the similarity determination processing to be equal to or greater than a predetermined threshold from a target of acquiring the character information by the character information acquisition processing and from a display target of displaying on the display unit by the display control processing.

In the capture processing, the processor performs the capturing at predetermined time intervals during a period from start to end of recording of a video file in which the video data received from the other information processing apparatus is recorded, and further performs association processing of associating character information acquired by the character information acquisition processing with the video file.

The processor further performs keyword extraction processing of extracting a keyword from characters included in the character information acquired by the character information acquisition processing, and associates the keyword with the video file in the association processing.

In the association processing, the processor stores the keyword in metadata of the video file to associate the keyword with the video file.

In the association processing, the processor generates associated data that associates the video file, elapsed time from start of recording the video file to capture for each still image file, and characters included in the character information recognized as characters from an image for the still image file with each other.

The processor further performs keyword extraction processing of extracting a keyword from characters included in the character information acquired by the character information acquisition processing, and in the association processing, the processor generates associated data that associates the video file, elapsed time from start of recording the video file to capture for each still image file, and the keyword included in the character information recognized as characters from an image for the still image file with each other.

The memory further temporarily stores audio data associated with video data received from the other information processing apparatus via the network, and in the capture processing, the processor further captures a screen area of the display unit configured to display video of the video data and subtitles that are audio data converted into characters, the video data and the audio data being received from the other information processing apparatus and stored in the memory, the captured screen area including a part of displaying the subtitles, the capture processing capturing the screen area that is a still image file at predetermined time intervals; and in the character information acquisition processing, the processor acquires the character information, which is a part of the subtitles included in at least a part of the images of a series of still image files captured by the capture processing and is recognized as characters, and stores the character information for each image.

The processor further performs file generation processing of generating a single data file that collects the character information, in which a part of the subtitles for each captured image acquired by the character information acquisition processing is recognized as a character, in the order of capturing of the images.

In the capture processing, the processor performs the capturing at predetermined time intervals during a period from start to end of recording of a video file in which the video data received from the other information processing apparatus is recorded, and further performs association processing of associating character information acquired by the character information acquisition processing with the video file.

In the association processing, the processor generates associated data that associates the video file, elapsed time from start of recording the video file to capture for each still image file, and characters included in the character information recognized as characters from an image for the still image file with each other.

An information processing apparatus according to a second aspect of the present invention includes: a memory that temporarily stores audio data received from another information processing apparatus via a network; and a processor configured to execute processing based on the audio data stored in the memory. The processor performs capture processing of capturing a screen area of a display unit configured to display subtitles that are based on audio data received from the other information processing apparatus, and are stored in the memory and recognized as characters, the captured screen area including a part of the screen area displaying the subtitles, the capture processing capturing the screen area that is a still image file at predetermined time intervals; and performs character information acquisition processing of acquiring character information, which is a part of the subtitles included in at least a part of the images of a series of still image files captured by the capture processing and is recognized as characters, and storing the character information for each image.

The processor further performs file generation processing of generating a single data file that collects the character information, in which a part of the subtitles for each captured image acquired by the character information acquisition processing is recognized as a character, in the order of capturing of the images.

A control method for an information processing apparatus according to the third aspect of the present invention including: a memory that temporarily stores video data received from another information processing apparatus via a network; and a processor configured to execute processing based on the video data stored in the memory, the control method includes: a capture step in which the processor captures a screen area of a display unit configured to display video of the video data received from the other information processing apparatus and stored in the memory, the captured screen area including at least a part of the video, the capture step capturing the screen area that is a still image file at predetermined time intervals; and while continuing capturing at the predetermined time intervals by the capture step, a step, in which the processor acquires character information that is recognized as characters and is acquired from at least a part of the images of a series of still image files captured by the capture step, and stores the character information for each image.

A control method for an information processing apparatus according to the fourth aspect of the present invention including: a memory that temporarily stores audio data received from another information processing apparatus via a network; and a processor configured to execute processing based on the audio data stored in the memory, the control method including: a capture step, in which the processor captures a screen area of a display unit configured to display subtitles that are based on audio data received from the other information processing apparatus, and are stored in the memory and recognized as characters, the captured screen area including a part of the screen area displaying the subtitles, the capture step capturing the screen area that is a still image file at predetermined time intervals; and a step, in which the processor acquires character information, which is a part of the subtitles included in at least a part of the images of a series of still image files captured by the capture step and is recognized as characters, and stores the character information for each image.

The above described aspects of present invention can enhance the convenience of online video conferencing.

BRIEF DESCRIPTION OF THE DRAWINGS

FIG. 7 illustrates an example of the captured image files according to the first embodiment.

FIG. 8 illustrates an example of the character information files according to the first embodiment.

FIG. 20 illustrates an example of the subtitle data file according to the fourth embodiment.

DETAILED DESCRIPTION OF THE INVENTION

The following describes some embodiments of the present invention, with reference to the attached drawings.

First Embodiment

First, the outline of an information processing apparatus according to the present embodiment is described below.

Figure 1:
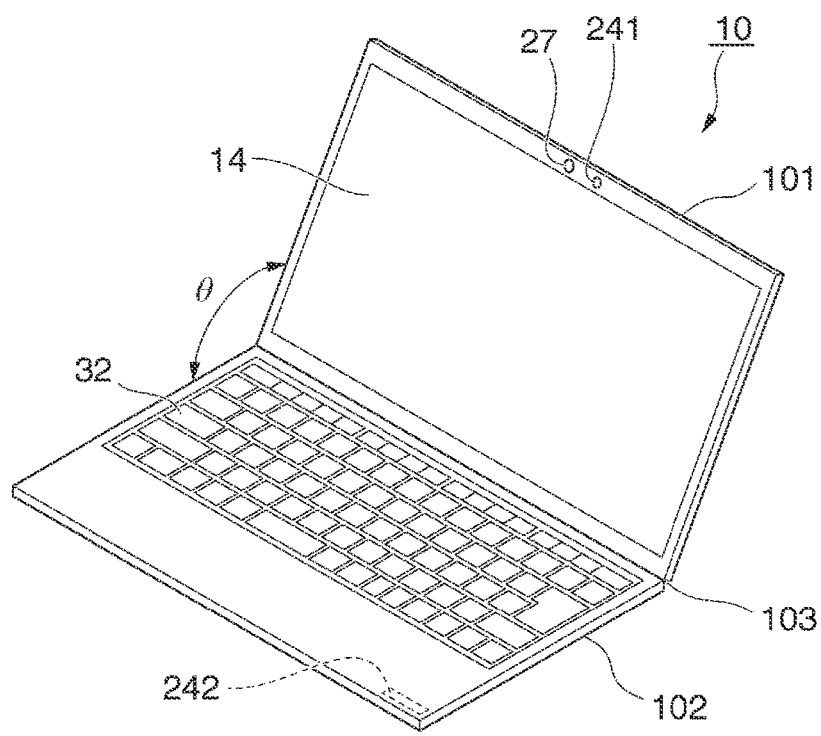
FIG. 1 is a perspective view illustrating the appearance of an information processing apparatus according to a first embodiment.

FIG. 1 is a perspective view illustrating the appearance of an information processing apparatus according to the present embodiment. The information processing apparatus 10 in the drawing is a clamshell type laptop personal computer (PC). The information processing apparatus 10 includes a first chassis 101, a second chassis 102 and a hinge mechanism 103. The first chassis 101 and the second chassis 102 are substantially quadrangular plate-shaped (e.g., flat plate-shaped) chassis. One of the side faces of the first chassis 101 and one of the side faces of the second chassis 102 are joined (connected) via the hinge mechanism 103, and the first chassis 101 and the second chassis 102 are relatively rotatable around the rotary shaft of the hinge mechanism 103. When the opening angle $\theta$ around the rotation axis of the first chassis 101 and the second chassis 102 is approximately 0°, the first chassis 101 and the second chassis 102 overlap to be closed (this posture is called "closed"). The surfaces of the first chassis 101 and the second chassis 102 facing each other in the closed state are referred to as "inner surfaces", and the surfaces opposite to the inner surfaces are referred to as "outer surfaces". The opening angle $\theta$ can also be referred to as the angle between the inner surface of the first chassis 101 and the inner surface of the second chassis 102.

As opposed to closed, when the first chassis 101 and the second chassis 102 are open, this posture is referred to as "open". In this open state, the first chassis 101 and the second chassis 102 are relatively rotated until the opening angle $\theta$ becomes larger than a preset threshold (e.g., 10°).

The inner surface of the first chassis 101 has a display unit 14. The display unit 14 displays video based on the processing executed by the information processing apparatus 10. The first chassis 101 has an area on the inner surface surrounding the display unit 14, in which an imaging unit 27 (camera) and a microphone 241 are placed. That is, the imaging unit 27 and the microphone 241 are placed at positions facing the user using the information processing apparatus 10. The microphone 241 may be divided into two microphones, one for the right side and the other for the left side.

The inner surface of the second chassis 102 has a keyboard 32 and a speaker 242. The keyboard 32 is an input device that accepts user operations. The speaker 242 may be divided into two speakers, one for the right side and the other for the left side. In the closed state, the user cannot view the display unit 14 and does not operate the keyboard 32. In the open state, the user views the display unit 14 and operates the keyboard 32 (i.e., the information processing apparatus 10 is operable).

The processor 10 executes programs for various types of applications. For example, the information processing apparatus 10 executes a program for an application that uses video captured by the imaging unit 27 and audio input to the microphone 241. In one example, it includes an application of allowing a plurality of users to communicate video and audio in both directions using their terminal devices, which is used for video conferences and other purposes. Such an application that can be used for a video conference is hereinafter referred to as a "video conference app." By executing the video conference app, the information processing apparatus 10 can be used as a terminal device for conducting a video conference with another user using the video conference app.

When a user uses the video conference app with the information processing apparatus 10, the imaging unit 27 captures video including the user (a participant in the video conference) facing the display unit 14. The microphone 241 receives the audio or other input from the user. The information processing apparatus 10 transmits the video captured by the imaging unit 27 and the audio input to the microphone 241 based on the processing of the video conference app to the terminal devices of other users participating in the video conference via a network. The information processing apparatus 10 also acquires captured video and audio from another user's terminal device via the network, displays the acquired video on the display unit 14, and outputs the acquired audio from the speaker 242. Thus, the video conference app allows each user participating in the video conference to talk with each other while mutually watching the video.

Examples of the network include the internet, mobile phone network, virtual private network (VPN), dedicated communication line network, wide area network (WAN), local area network (LAN), public switched telephone network (PSTN) and a communication network composed of a combination of them.

Some video conference apps have a function that allows the screen displaying a material and other information on the presenter's terminal device to be viewed on the terminal devices of other participants. Using this function, the presenter may explain to other participants while sharing the material. However, when the presenter is explaining while turning over the pages of the material, a participant may want to see a page before the currently viewed page of the material. Inconveniently, the shared material is displayed as video to the participants, and if a participant may want to look up for or use elsewhere some of the words, characters, or sentences described in the material, they have to type these words, characters or sentences each time.

Then, the information processing apparatus 10 in this embodiment captures a screen area that contains at least part of the video received from another user's terminal device using the video conference app, where the screen area is captured in the form of a still image file at predetermined time intervals. The information processing apparatus 10 also acquires character information from the captured image by character recognition and stores the character information in association with the image. The character recognition processing may be performed using the optical character recognition (OCR) function if the OS (operating system) executed by the information processing apparatus 10 has such a function, or using another application with an OCR function executed by the information processing apparatus 10. The character recognition processing may be a process using an OCR service provided in the cloud.

During execution of the video conference app, the information processing apparatus 10 displays at least a part of the images in the captured series of still image files in association with character information recognized as characters from those images, while continuing this capture at predetermined time intervals. With this configuration, if a user wants to see a page before the current page of the material shared by the presenter, the information processing apparatus 10 allows the user to freely select the page from the captured images for displaying. The information processing apparatus 10 also allows a user to select and use words, characters, or sentences described in the material shared by the presenter from the captured images. For example, the information processing apparatus 10 allows a user to select a word, characters, or a sentence in the material from the captured images for copying it or searching on Web or dictionary. If the selected sentence is a URL (uniform resource locator), the information processing apparatus 10 displays a Web page indicated by the URL as a hyperlink.

Hereinafter, the image that has been captured is referred to as a "captured image", and the captured still image file is referred to as a "captured image file". The character information recognized as characters from a captured image includes the data of the characters recognized from the captured image (hereinafter referred to as "text data") and the data of the position of the characters in the captured image (hereinafter referred to as "position data"). Displaying the captured image and the character information in association with each other means displaying the text data of the characters in association with the image area of the characters in the captured image. The user may obtain the text data of the characters by selecting a portion of the image area of the characters in the displayed capture image.

The function of capturing video of the video conference app and displaying the captured image in association with the character information is implemented by executing an application (hereinafter referred to as "review app") different from the video conference app. This allows the review app to be used without limiting the target application. This review app can be used not only for the video (live video) during the conference by the video conference app, but also for the already recorded video (moving image) file. That is, the review app has the function of capturing video of a video file and displaying the captured image in association with character information.

Figure 2:
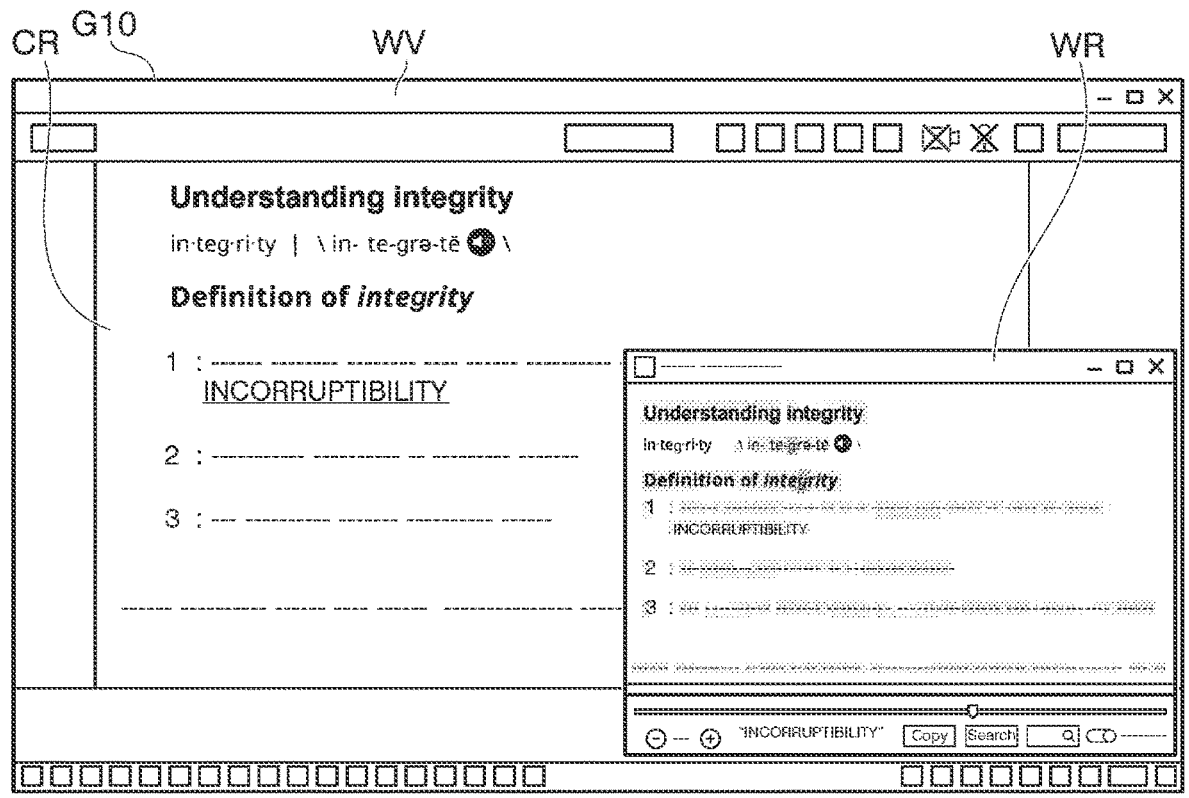
FIG. 2 illustrates a display example of the review app according to the first embodiment.
Figure 3:
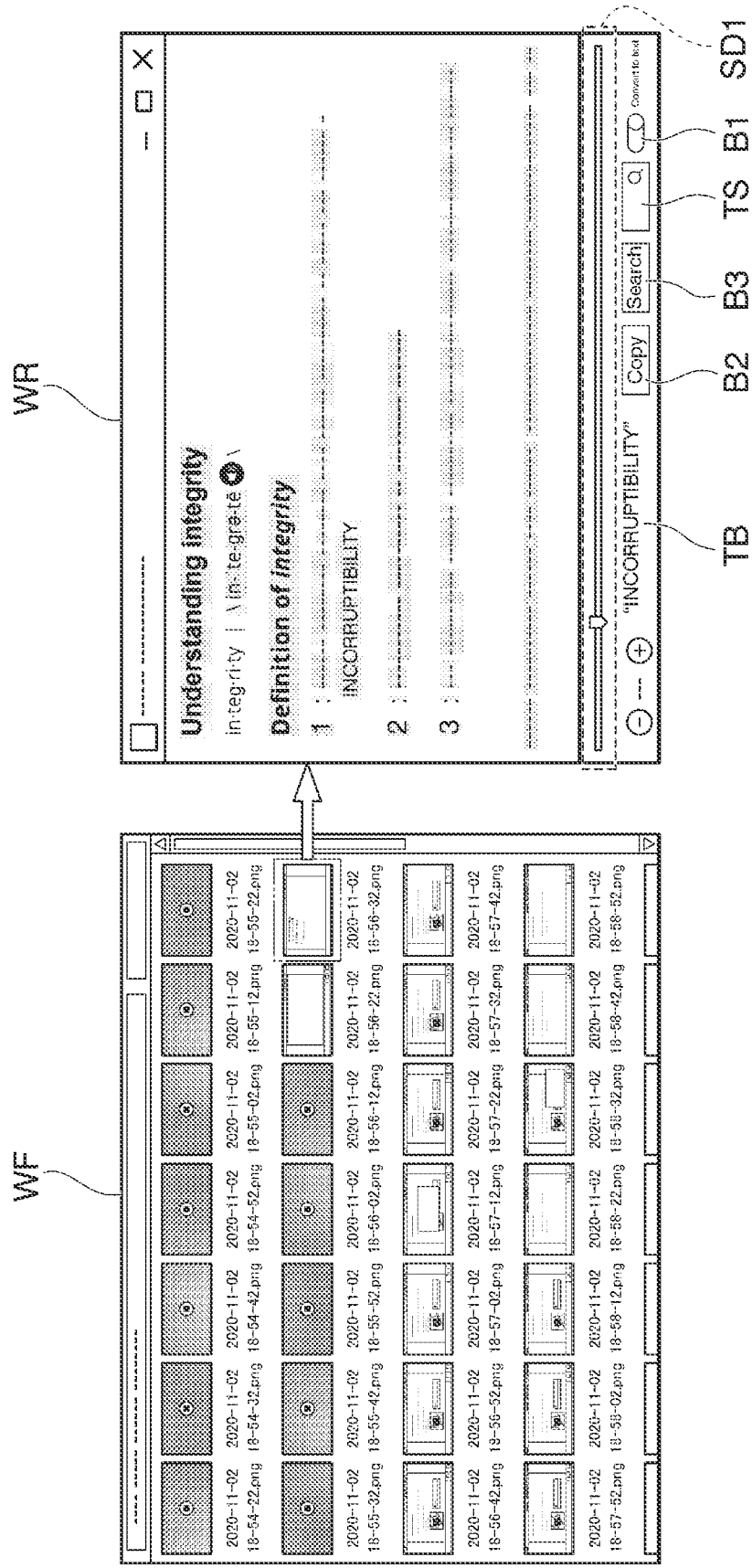
FIG. 3 illustrates the captured images and its display by the review app according to the first embodiment.

Referring to FIGS. 2 and 3, the following describes the overview of the review app.

FIG. 2 illustrates a display example of the review app according to the present embodiment. The display screen G10 indicates the full screen area of the display unit 14 of the information processing apparatus 10. On the display screen G10, the window WV of the video conference app is displayed in full screen. The window WV of the video conference app may display other users participating in the video conference and a material being shared. In the illustrated example, the current page of the shared material is displayed. On the display screen G10, the review app window WR is superimposed on the window WV of the video conference app. This review app window WR displays a captured image of the content area CR that is a part of the material displayed on the window WV of the video conference app. The window WR of the review app may display any captured image among the images captured from the start of the conference (start of capture) to the present.

The review app window WR is the active window, which is smaller than the video conference app window WR. Therefore, the user is allowed to display and review any captured image on the review app window WR while viewing the video conference app window WR during the video conference.

FIG. 3 describes the captured images and its display by the review app according to the present embodiment. This figure illustrates the window WF displaying the files in the folders where the captured image files are saved, and the window WR of the review app of FIG. 2. In these folders, captured image files that are captured at predetermined time intervals (e.g., every 10 seconds) are stored in the order of the capture. For example, the file name of each captured image file is created based on the time of the captured image. These folders may be created for each capture period from the start to the end of capture by the review app.

A slider SD1 is displayed as an operation user interface (UI) for the user to select a captured image to be displayed on the window WR of the review app. The captured images are associated with the slider SD1 in the order of the capture from the left end to the right end of the slider SD1. Moving the slider SD1 to the left displays the captured image captured earlier, and moving the slider SD1 to the right displays the captured image captured later. Moving the slider SD1 to the left end displays the captured image captured first, and moving the slider SD1 to the right end displays the last captured image captured at that point in time. For example, if files of nine captured images are saved, moving the slider SD1 to the left end will display the first captured image, and moving the slider SD1 to the center will display the fifth captured image. Then, moving the slider SD1 to the right end will display the ninth captured image. Thus, the length of the slider bar of the slider SD1 is evenly divided by the number of stored captured images, and the captured image corresponding to the position of the slider SD1 is displayed. When the tenth captured image is saved after that, the length of the slider bar of slider SD1 is changed from being evenly divided with nine images to evenly divided with ten images, and moving the slider SD1 to the right end will display the tenth captured image.

Thus, when a presenter is explaining to other participants in a video conference while sharing a material, the information processing apparatus 10 allows the participants to view and check a page of the material that was displayed any time before the page of the material that the presenter is currently displaying. The window WR of the review app has an operation button B1 ("Convert to text"), which is an operator for switching as to whether or not the characters contained in the captured image are selectable (i.e., whether or not text data is obtainable from the captured image). When the user operates this operation button B1, the device is switched so that the text data can be obtained from the captured image, so that a character part (i.e., a character-recognized part) in the captured image from which the text data can be acquired is displayed in a specific display mode (e.g., highlighted).

When the user operates again with the operation button B1 while text data can be acquired from the captured image, the device returns to the state where text data cannot be acquired from the captured image (simply displaying the captured image). Every time the user operates with the operation button B1, the device switches between the state in which text data can be acquired from the captured image and the state in which text data cannot be acquired from the captured image.

The default setting when a captured image is displayed in the review app window WR may be that text data cannot be acquired from the captured image or that text data can be acquired from the captured image. Although this embodiment describes an example in which the device is switchable between the state in which text data can be acquired from a captured image and the state in which text data cannot be acquired. Another embodiment may not have this switching function, and when displaying a captured image in which text information has already been acquired, the device may be always in the state capable of acquiring text data.

The review app window WR in the drawing indicates that text data can be acquired from the captured image. This means that when the user selects the "INCORRUPTIBILITY" portion of the captured image displayed on the window WR, the text data of "INCORRUPTIBILITY" is displayed in the area of code TB. Then, when the user operates with an operation button B2, the text data of "INCORRUPTIBILITY" is copied and can be pasted into another application or the like. When the user operates with an operation button B3, a search of "INCORRUPTIBILITY" that is a search word is executed using an application of the browser (web browser). The search may use a search engine of the browser, or may use a dictionary site that can be used by the browser.

A search box TS allows search for characters included in the captured image or characters included in the captured images in the same folder by inputting any characters. If the entered characters are present in the captured image, the captured image is displayed. If the entered characters are present in the captured image, the portion of the characters may be selected and the text data of the characters may be displayed in the area of the code TB.

When a user selects a URL displayed in the window WR, the web page indicated by the URL is displayed on the browser.

Figure 4:
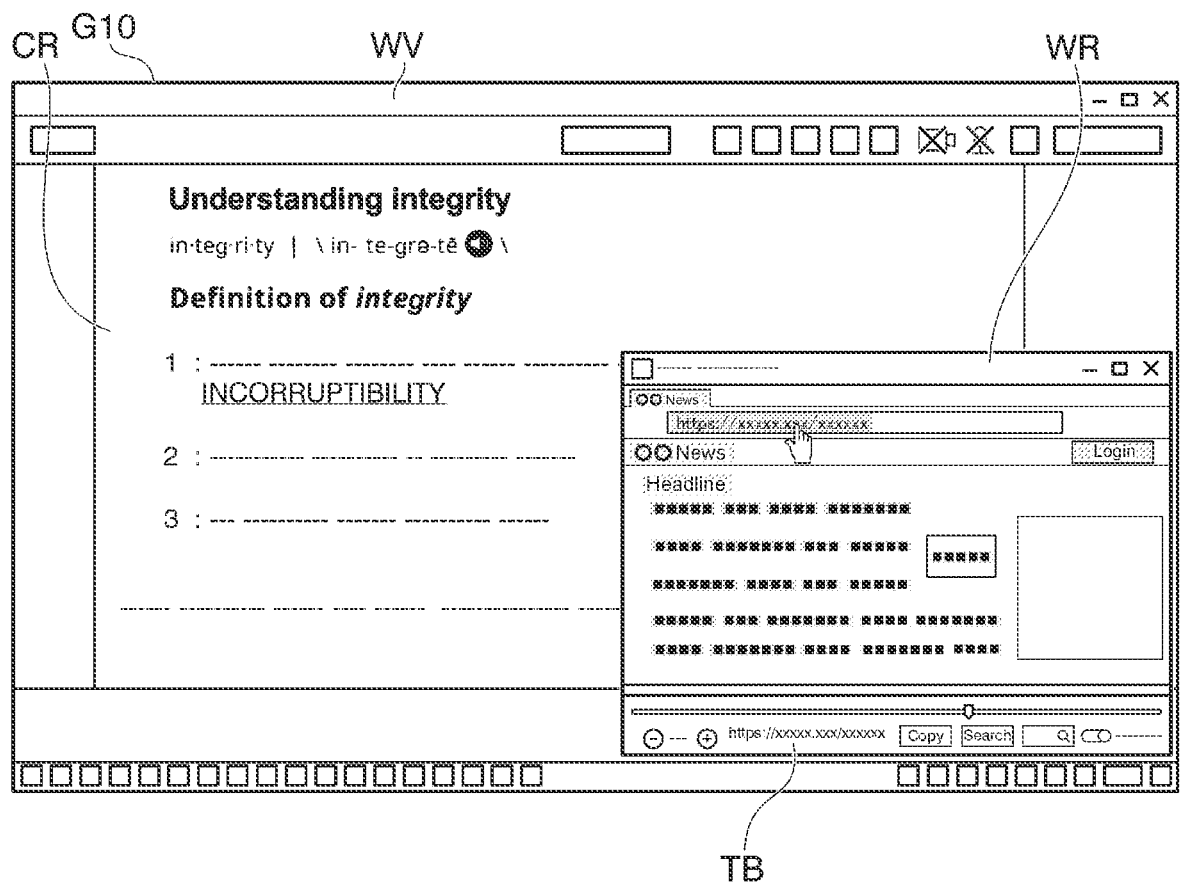
FIG. 4 illustrates when a URL in the captured image is selected on the review app of the first embodiment.

FIG. 4 describes when a URL in the captured image is selected on the review app of the present embodiment. Similar to FIG. 2, in the display example of the review app in FIG. 4, the video conference app window WV is displayed in the full screen on the display screen G10, and the review app window WR is superimposed on the video conference app window WV. In this example, the review app window WR displays a captured image that was captured when the browser screen was previously shared on the video conference app window WV. When the user selects the part of the URL "Https://xxxxx.xxx/xxxxxx" of the captured image displayed in the window WR, the text data of that URL is displayed in the area of code TB, and the browser is activated to display the web page indicated by that URL.

[Hardware Configuration of Information Processing Apparatus 10]

Figure 5:
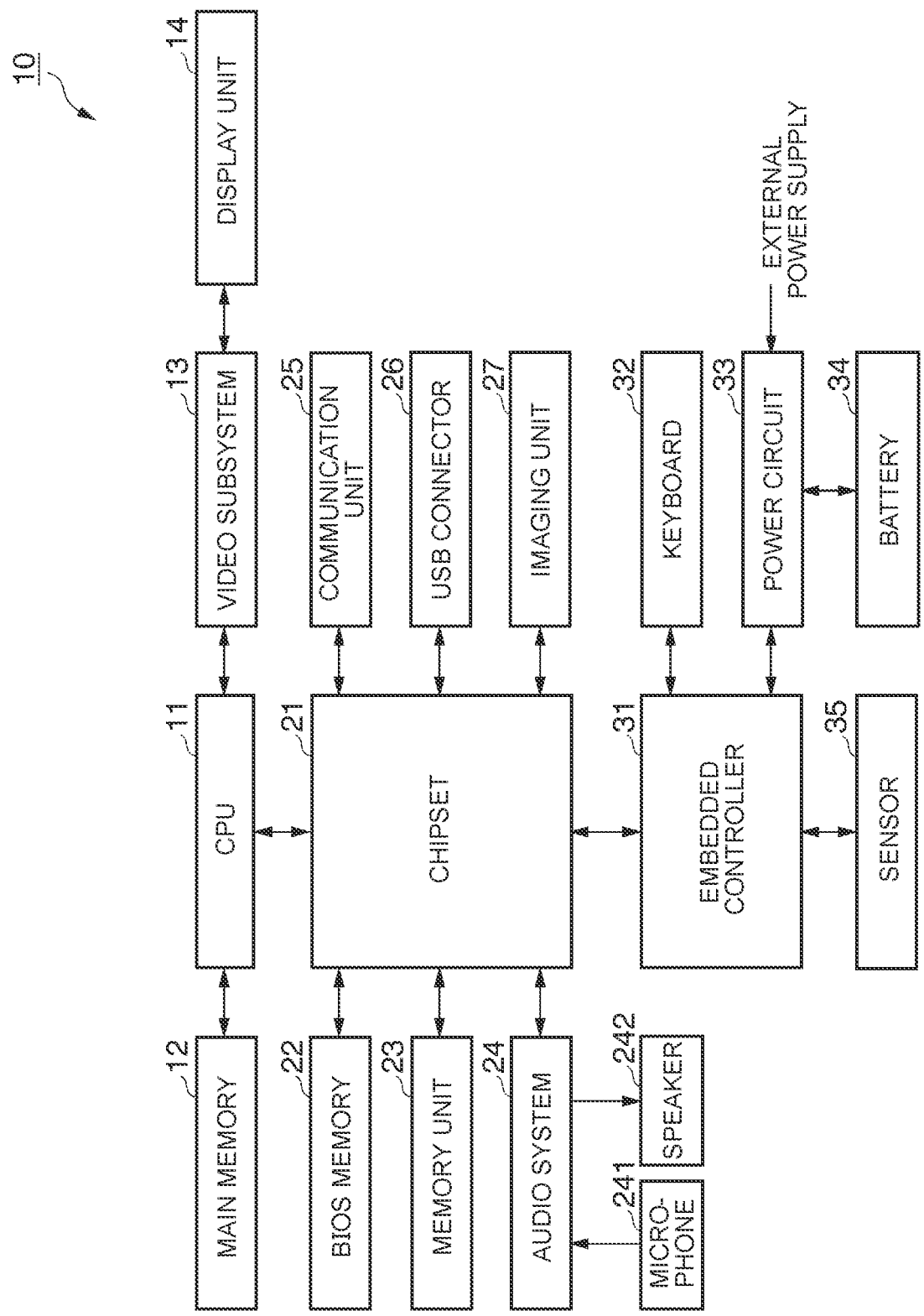
FIG. 5 is a block diagram illustrating one example of the hardware configuration of the information processing apparatus according to the first embodiment.

Referring next to FIG. 5, the major hardware configuration of the information processing apparatus 10 is described. FIG. 5 is a block diagram illustrating one example of the hardware configuration of the information processing apparatus 10 according to the present embodiment.

The information processing apparatus 10 includes a CPU 11, a main memory 12, a video subsystem 13, the display unit 14, a chipset 21, a BIOS memory 22, a memory unit 23, an audio system 24, a communication unit 25, a USB connector 26, the imaging unit 27, an embedded controller 31, the keyboard 32, a power circuit 33, a battery 34, and a sensor 35.

The CPU 11 executes various types of arithmetic processing under the control of programs to control the information processing apparatus 10 as a whole. In one example, the CPU 11 executes processing based on the OS (operating system) and a BIOS program. The CPU 11 also executes processing based on various drivers, various services/utilities, applications, etc. executed on the OS.

The main memory 12 is a writable memory functioning as a read-in area of a program executed by the CPU 11 or a work area to write data processed by the executed program. In one example, the main memory 12 includes a plurality of dynamic random access memory (DRAM) chips. The program executed includes an OS, various types of drivers to operate peripherals as hardware, various types of service/ utility and application programs.

The video subsystem 13 is to implement the functions related to image displaying, and includes a video controller. This video controller processes a drawing instruction from the CPU 11 and writes the processed drawing information on a video memory. The video controller also reads this drawing information from the video memory and outputs the drawing information as drawing data (display data) to the display unit 14.

The display unit 14 is a liquid crystal display or an organic electro-luminescence (EL) display, for example, and displays a screen based on the drawing data (display data) output from the video subsystem 13.

The chipset 21 includes a controller, such as USB (Universal Serial Bus), serial AT attachment (ATA), serial peripheral interface (SPI) bus, peripheral component interconnect (PCI) bus, PCI-Express bus, or low pin count (LPC) bus, and a plurality of devices are connected to the chipset. In one example, the plurality of devices include the BIOS memory 22, the memory unit 23, the audio system 24, the communication unit 25, the USB connector 26, and the embedded controller 31, which are described below.

The BIOS memory 22 includes a non-volatile memory that is electrically rewritable, such as an electrically erasable programmable read only memory (EEPROM) or a flash ROM. The BIOS memory 22 stores BIOS and system firmware to control the embedded controller 31 or the like.

The memory unit 23 includes a hard disk drive (HDD) or a solid state drive (SSD). In one example, the memory unit 23 stores an OS, various types of drivers, various types of services/utilities, application programs, and various types of data.

The audio system 24, to which the microphone 241 and the speaker 242 are connected, records, reproduces, and outputs audio data. In one example, the microphone 241 and the speaker 242 are built in the information processing apparatus 10. The microphone 241 and the speaker 242 may be peripheral devices connected to the information processing apparatus 10 using USB or near field communication such as Bluetooth (registered trademark).

The communication unit 25 connects to a network via wireless local area network (LAN) or wired LAN for data communication. When receiving data from the network, for example, the communication unit 25 generates an event trigger indicating the data reception. The communication unit 25 may communicate with peripheral devices through near field communication such as Bluetooth (registered trademark).

The USB connector 26 is to connect peripherals using USB.

The imaging unit 27 includes lenses and an image pickup element (not illustrated), captures a subject image input through the lenses, and converts the image into imaging data that is an electrical signal for outputting. For example, the imaging unit 27 images a predetermined range (angle of view) in the direction facing the display unit 14, and outputs the captured imaging data. In one example, when the user is using the video conference app, the imaging unit 27 outputs imaging data obtained by capturing the image of the user at the position facing the display unit 14.

The keyboard 32 is an input device having a plurality of keys (an example of an operator) that accepts user operations. As illustrated in FIG. 1, the keyboard 32 is placed on the inner surface of the second chassis 102. The keyboard 32 outputs input information (e.g., the operation signal indicating a key operated on the keyboard) input by a user operation to the embedded controller 31.

In one example, the power circuit 33 includes a DC/DC converter, a charge-discharge unit, and an AC/DC adaptor. In one example, the power circuit 33 converts a DC voltage supplied from an external power supply such as an AC adaptor (not illustrated) or the battery 34 into a plurality of voltages required to operate the information processing apparatus 10. The power circuit 33 supplies electricity to various parts of the information processing apparatus 10 under the control of the embedded controller 31.

In one example, the battery 34 is a lithium battery, and when the information processing apparatus 10 is supplied with power from an external power source, the battery 34 is charged via the power circuit 33. When the information processing apparatus 10 is not supplied with power from an external power source, the battery 34 outputs the charged electric power as the operating power of the information processing apparatus 10 via the power circuit 33.

The sensor 35 includes various sensors such as a Hall sensor, an acceleration sensor, and a temperature sensor. Each of the various sensors is placed at each detection target and outputs a detection signal. For example, the Hall sensor is used to detect whether the information processing apparatus 10 is in the open state or the closed state. The acceleration sensor is used to detect the direction and movement of the information processing apparatus 10 or the opening angle θ between the first chassis 101 and the second chassis 102. The temperature sensor is used to detect the internal temperature of the information processing apparatus 10.

The embedded controller 31 is a one-chip microcomputer to monitor and control various devices (e.g., peripherals and sensors), irrespective of the system state of the information processing apparatus 10. The embedded controller 31 includes a CPU, a ROM, a RAM, an A/D input terminal, a D/A output terminal, a timer, and a digital input/output terminal for a plurality of channels, which are not illustrated. In one example, to the digital input/output terminal of the embedded controller 31, the keyboard 32, the power circuit 33, and the sensor 35 are connected. The embedded controller 31 receives input information (operation signal) from the keyboard 32 and a sensor signal from the sensor 35. The embedded controller 31 controls the operation of the power circuit 33.

[Functional Configuration of Information Processing Apparatus 10]

Next, the functional configuration implemented by the information processing apparatus 10 executing the above-mentioned video conference app and review app will be described.

Figure 6:
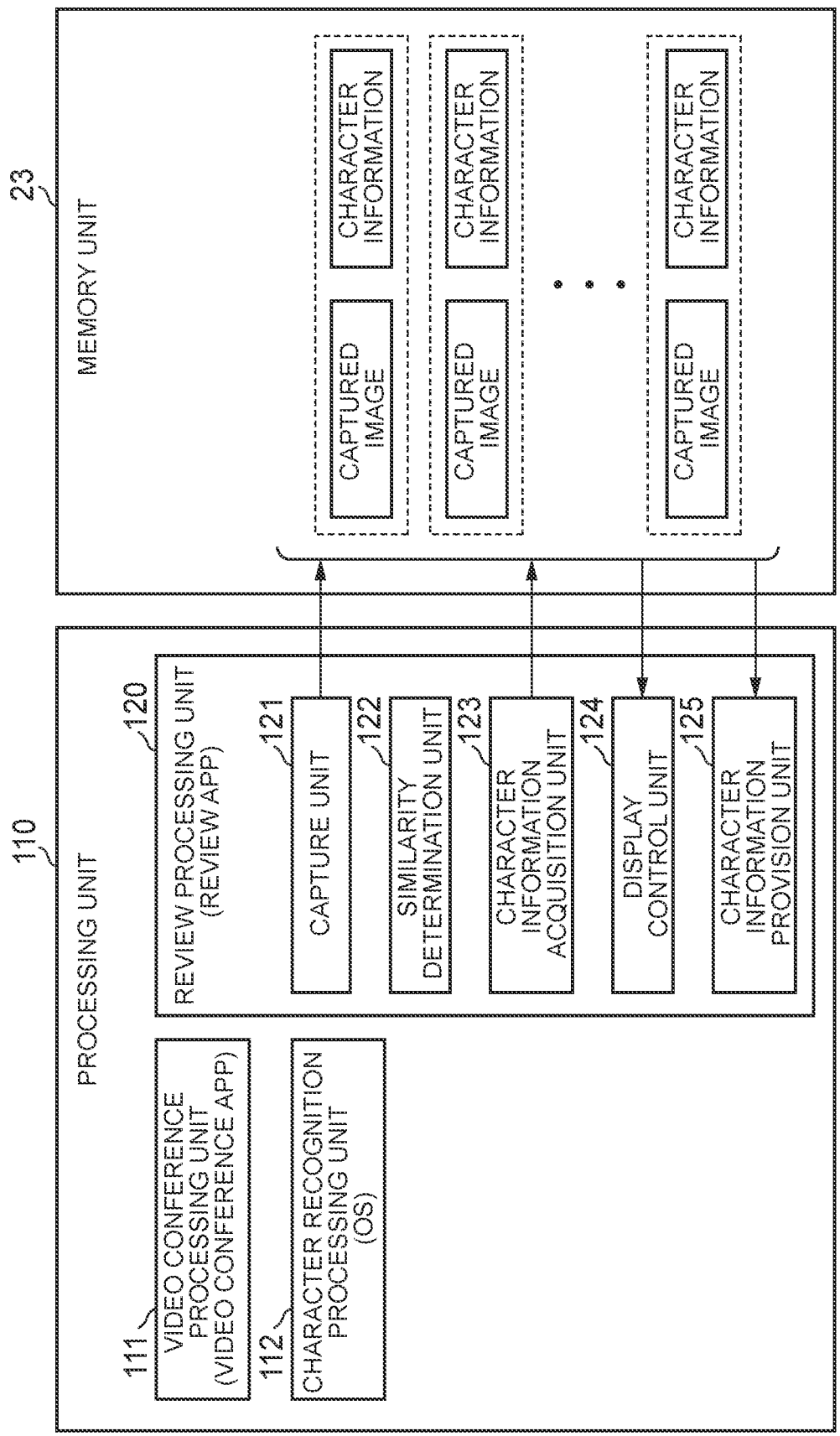
FIG. 6 is a block diagram illustrating one example of the functional configuration of the information processing apparatus according to the first embodiment.

FIG. 6 is a block diagram illustrating one example of the functional configuration of the information processing apparatus 10 according to the present embodiment. The information processing apparatus 10 includes a processing unit 110 that is a functional configuration implemented when the CPU 11 executes various programs. The processing unit 110 includes a video conference processing unit 111, a character recognition processing unit 112, and a review processing unit 120.

The video conference processing unit 111 is a functional configuration implemented through the execution of the video conference app. For example, the video conference processing unit 111 temporarily stores video data received by the communication unit 25 from the terminal device (information processing apparatus) of another user via a network and audio data associated with the video data in the main memory 12, displays the video based on the video data on the window WV (see FIGS. 2 and 4) of the video conference app, and outputs the audio based on the audio data from the speaker 242. The video conference processing unit 111 also transmits video data of the video captured by the imaging unit 27, the display screen of the display unit 14 or the video data of the screen of the running application and audio data of the audio input to the microphone 241 from the communication unit 25 to other users' terminal devices (information processing apparatuses) via the network.

The character recognition processing unit 112 is an OCR functional configuration that the OS has. For example, the character recognition processing unit 112 performs character recognition on the captured image according to the instruction of the review processing unit 120, and returns the character information recognized as characters in the captured image to the review processing unit 120.

The review processing unit 120 is a functional configuration implemented through the execution of the review app. The following describes the review processing unit 120 in detail. The review processing unit 120 includes a capture unit 121, a similarity determination unit 122, a character information acquisition unit 123, a display control unit 124, and a character information provision unit 125.

The capture unit 121 captures a screen area of the display unit 14 on which video received from another terminal device (information processing apparatus) by the video conference processing unit 111 is displayed, the screen area including at least a portion of the video, as a captured image file (still image file) at predetermined time intervals. In one example, the capture unit 121 captures the screen area at every 10 seconds and sequentially saves captured image files in the memory unit 23.

For example, the capture unit 121 captures the content area CR (see FIGS. 2 and 4) in the window WV (FIGS. 2 and 4) of the video conference app. In one example, the capture unit 121 performs image analysis on the video received from another terminal device (information processing apparatus) by the video conference processing unit 111, thus detecting the content area CR from the video of the video conference app. Any method of image analysis, such as edge detection, can be used. The user may perform an operation of specifying a range of the content area CR as the range to be captured, whereby the capture unit 121 may capture the content area CR.

The capture unit 121 may capture the entire screen area of the display unit 14 (the entire area of the desktop screen) or the window WV area of the video conference app. Capturing only the content area CR is more efficient because it avoids capturing images that are unnecessary for character recognition.

Note here that whether the screen area to be captured by the capture unit 121 is the content area CR detected by image analysis, the full screen area of the display unit 14 (the entire desktop screen), the area of the window WV of the video conference app, or an area specified by the user, may be set in advance or may be set or changed by the user before the capture begins.

If the entire desktop screen is set as the screen area to be captured, the area of the window WR of the review app can be excluded from the capture target. When the window WV area of the video conference app, the content area CR, or the area specified by the user is set to the screen area to be captured, the window WV of the video conference app may be hidden by the window of another application. In this case also, the video displayed in the set area of the window WV area of the video conference app can be captured.

The user may be able to set in advance whether or not the UI (mouse pointer, mouse cursor, etc.) indicating the current operation position displayed on the display screen of the display unit 14 is to be captured.

The capture unit 121 starts or ends the capture in response to user operation, for example. In one example, the window WR illustrated in FIGS. 2 and 3 may display an operation UI for starting or ending the capture. In response to the user's operation with this operation UI, the capture unit 121 may then start or end the capturing.

The capture unit 121 may start or end the capturing by automatically detecting the start or end of a video conference. For example, the capture unit 121 may start capturing when it detects that the video conference app has occupied the microphone 241 or the speaker 242.

The state in which the video conference app occupies the microphone 241 means that the video conference app is permitted to use the microphone 241. Specifically, the OS gives the video conference app the right to use (occupy) the microphone 241. The state of occupying the microphone 241 does not mean, when a video conference using the video conference app is being conducted, the user's input operation for muting and unmuting the microphone 241 to temporarily switch the function of the microphone 241 on the video conference app from off to on. The state in which the video conference app occupies the speaker 242 means that the video conference app is permitted to use the speaker 242. Specifically, the OS gives the video conference app the right to use (occupy) the speaker 242.

The capture unit 121 may stop the capture when it detects that the video conference app has released the microphone 241 or speaker 242 that was occupied.

The state in which the video conference app releases the microphone 241 means that the video conference app releases the right to use the microphone 241. Specifically, the OS releases the right to use the microphone 241 that has been given to the video conference app. For example, the state of releasing the microphone 241 does not mean, when a video conference using the video conference app is being conducted, the user's input operation for muting and unmuting the microphone 241 to temporarily switch the function of the microphone 241 on the video conference app from on to off. The state in which the video conference app releases the speaker 242 means that the video conference app releases the right to use the speaker 242. Specifically, the OS releases the right to use the speaker 242 that has been given to the video conference app.

FIG. 7 illustrates an example of the captured image files stored in the memory unit 23. Captured images are saved as captured image files each time they are captured. For example, the file is given a name based on the time when it was captured. The file names may be numbered in ascending order such as 001, 002, 003, . . . in the order of the capture. The path of the file may be added to the file name. The file format is not limited to PNG as an example here, which may be GIF, JPEG, BMP, and other file formats. Each captured image file is associated with time information (time stamp) indicating the time when it was captured. Each captured image file also is associated with flag information indicating whether or not to be reviewed. For example, the flag for the review target is set to "1", and the flag not for the review target is set to "0".

Each time a captured image is captured by the capture unit 121, the similarity determination unit 122 compares the captured image captured this time with a captured image captured previously to determine the similarity. Any determination method such as image pattern matching can be used to determine the similarity of images. For example, the similarity determination unit 122 determines the similarity between the captured image captured this time and the captured image captured previously. Then, if the similarity determination unit 122 determines that the similarity is less than a predetermined threshold, it determines that the content of the shared material has been changed, and sets the captured image captured this time as review target (sets the review target flag to "1"). If the similarity determination unit 122 determines that the similarity is equal to or greater than the predetermined threshold, it determines that the content of the shared material has not been changed, and does not set the captured image captured this time as review target (sets the review target flag to "0").

The above-mentioned predetermined threshold is a threshold determined in advance to determine whether or not the content of the captured images is the same (that is, whether or not the material (content) shared by the video conference app has been changed). The similarity determination unit 122 does not determine the first captured image because there is no captured image captured before whose similarity is to be determined, and sets it as review target (sets the review target flag to "1").

The character information acquisition unit 123 acquires character information recognized as characters from at least some of the captured images in the series of captured image files captured by the capture unit 121, and stores the character information for each captured image in the memory unit 23. For example, the character information acquisition unit 123 uses the OCR function of the character recognition processing unit 112 to acquire character information recognized as characters from the captured images. Character information includes text data of the characters recognized from a captured image and position data of the location where the characters were recognized. The character information acquisition unit 123 associates the captured image with the character information and saves it as a character information file in the memory unit 23.

Instead of the OCR function of the character recognition processing unit 112 (OS), the character information acquisition unit 123 may use the OCR function of another application or an OCR service provided in the cloud.

FIG. 8 illustrates an example of a character information file stored in the memory unit 23. The character information file is associated with the file name of the captured image, described referring to FIG. 7, and the text data and position data of the characters recognized from the captured image. The position data indicates the location of the characters recognized from the captured image in the captured image. For example, the position data is represented in the XY coordinate system, where the horizontal direction of the captured image is X axis and the vertical direction is Y axis. For example, the position of the characters is represented with the XY coordinates with the upper left corner of the captured image set as the reference position (0, 0) of the XY coordinate system.

For example, the character information acquisition unit 123 acquires character information recognized as characters from the captured image while the capture unit 121 continues capturing at predetermined time intervals during execution of the video conference app. The text information acquisition unit 123 also refers to the review target flag of the captured image file in FIG. 7 to set a captured image set for review target as a target of acquiring character information, and exclude a captured image not set for review target from the target of acquiring character information.

The display control unit 124 displays at least some of the captured images in a series of captured image files captured by the capture unit 121 on the display unit 14 while the capture unit 121 continues capturing at predetermined time intervals during execution of the video conference app. Specifically, the display control unit 124 reads a captured image file stored in the memory unit 23. Then, the display control unit 124 displays the captured image of the read captured image file on the review app window WR illustrated in FIGS. 2 to 4.

For example, the display control unit 124 displays the slider SD1, which allows the user to select each of the series of captured image files captured by the capture unit 121 corresponding to the capture order, on the display unit 14. Then, the display control unit 124 displays the captured image of the captured image file selected according to the user's operation with the slider SD1 on the display unit 14 (window WR) (see FIG. 3).

Here, the display control unit 124 refers to the review target flag of the captured image file in FIG. 7 to set the captured images set for review target to be displayed on the display unit 14, and exclude captured images not set for review target from the target to be displayed on the display unit 14.

The display control unit 124 also displays the captured image in association with the character information. For example, when the user operates with the operation button B1 illustrated in FIG. 3, the display control unit 124 refers to the character information file illustrated in FIG. 8. Then, the display control unit 124 switches the device to a state in which text data can be acquired from the captured image, and displays the part of the characters in the captured image from which text data can be acquired (i.e., the part where characters are recognized) in a specific display mode (e.g., highlighted).

In accordance with the user's operation at the position where the characters in the captured image were recognized and displayed on the display unit 14 (window WR), the character information provision unit 125 provides text data of the recognized characters so that the text data can be applied to various processes. In one example, the character information provision unit 125 provides the characters recognized from the captured image to be copiable. For example, as explained with reference to FIG. 3, after the user performs an operation to select one of the recognized characters from the captured image, the user may operate with the operation button B2. Then, the character information provision unit 125 copies the text data of the characters selected by the user and provides it so that it can be applied to various processes.

The character information provision unit 125 also provides the characters recognized from the captured image so that they can be searched using a browser application. For example, as explained with reference to FIG. 3, after the user performs an operation to select one of the recognized characters from the captured image, the user may operate with the operation button B3. Then, the character information provision unit 125 provides the text data of the characters selected by the user so that the text data can be a search word of the browser application to be searchable.

When the characters recognized from the captured image indicate a URL, the character information provision unit 125 provides the resource (e.g., webpage) identified by the URL so that the resource can be displayed on the display unit 14. For example, as explained with reference to FIG. 3, when the user selects characters (sentence) indicating a URL among the characters recognized in a captured image, the character information provision unit 125 provides the resource identified by the URL so that the resource can be displayed by the browser.

[Review Process]

Figure 9:
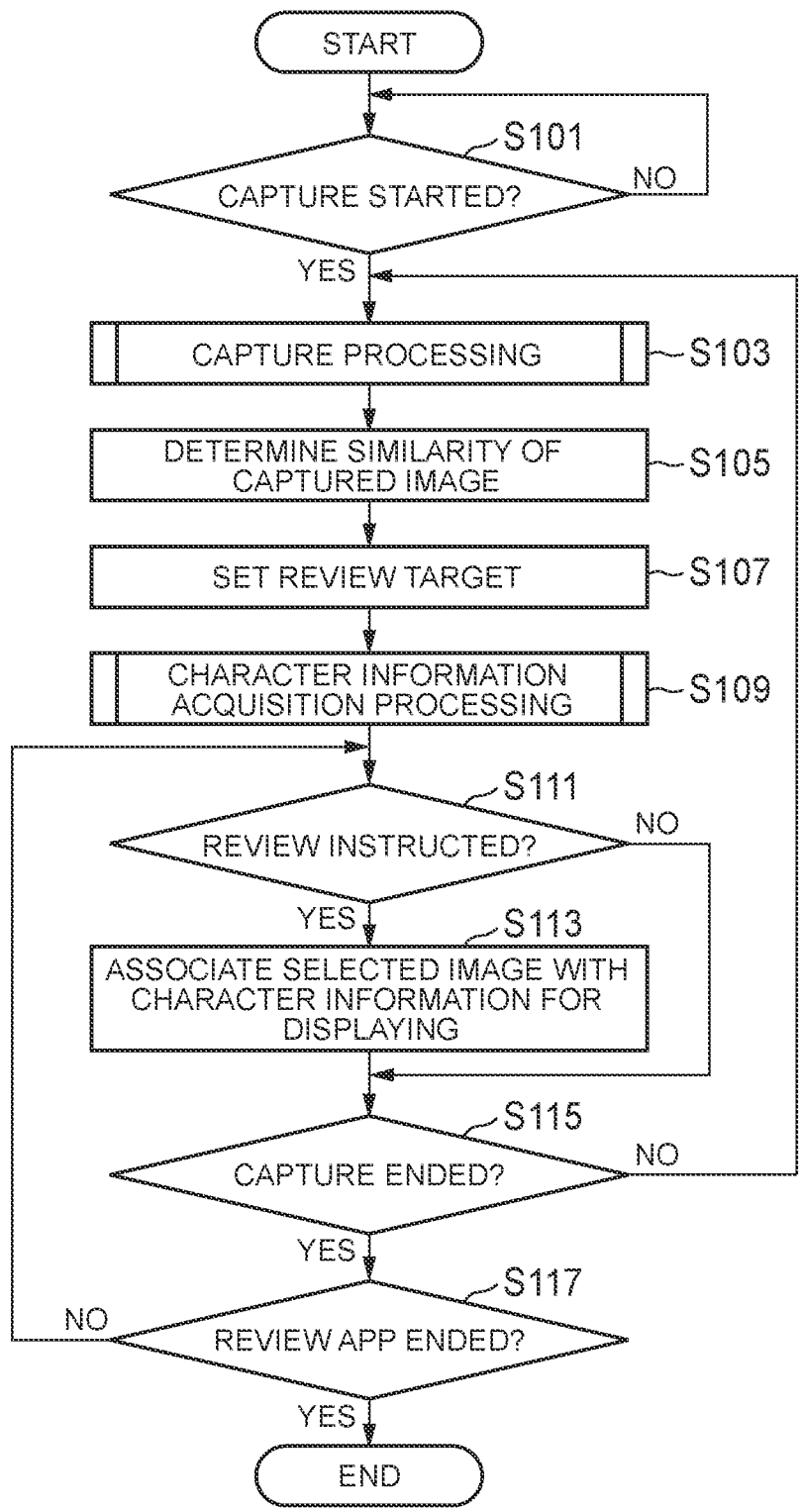
FIG. 9 is a flowchart of one example of the review processing according to the first embodiment.
Figure 10:
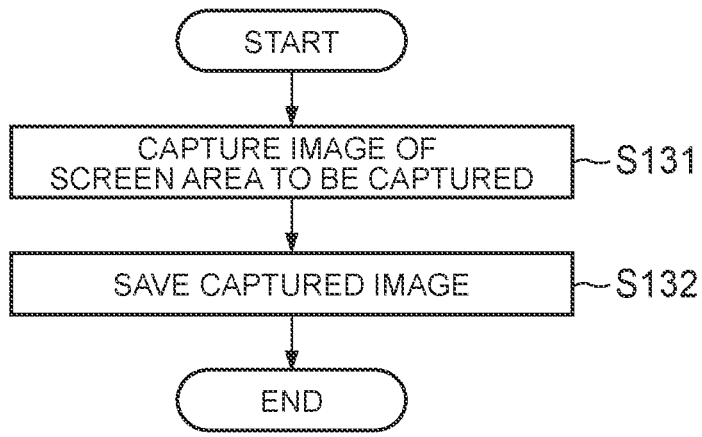
FIG. 10 is a flowchart of one example of the capture processing according to the first embodiment.
Figure 11:
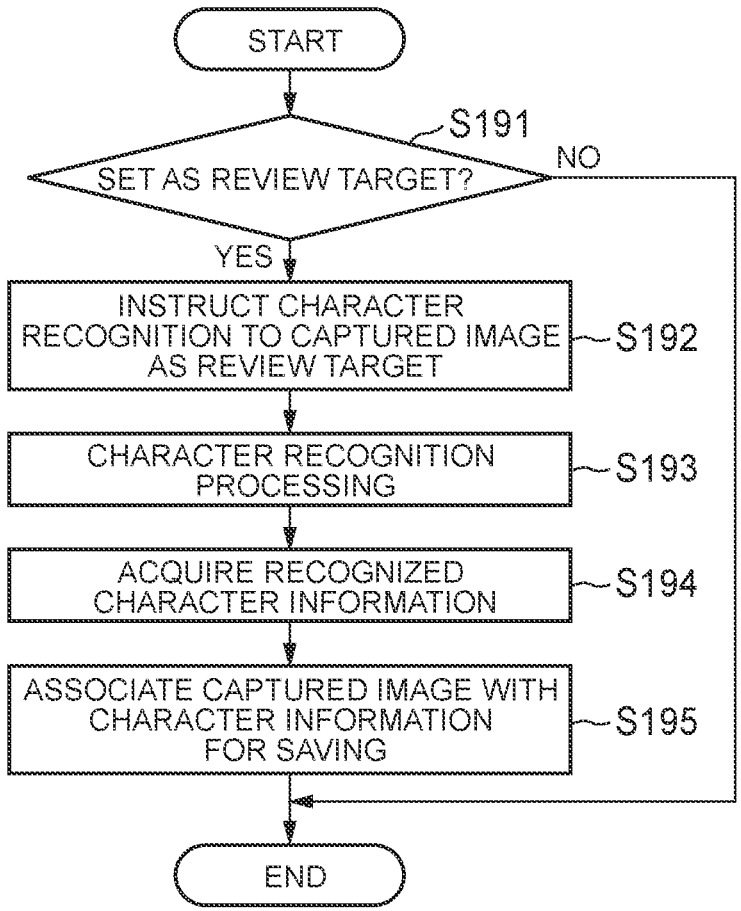
FIG. 11 is a flowchart of one example of the character information acquisition processing according to the first embodiment.

Referring next to FIGS. 9 to 11, the following describes the operation of the review process, in which the review processing unit 120 of the information processing apparatus 10 displays a captured image in association with character information.

FIG. 9 is a flowchart of one example of the review processing according to the present embodiment. For example, the review processing in the drawing starts with the activation of the review app.

(Step S101) The review processing unit 120 determines whether or not to start capturing. For example, when the user performs the operation to start capturing or when detecting that the video conference app occupies the microphone 241 or speaker 242, the review processing unit 120 determines that a capture start event has occurred (YES) and the procedure proceeds to step S103. When the review processing unit 120 determines that no capture start event has occurred (NO), the procedure continues the processing at this step S101.

(Step S103) The review processing unit 120 executes the capture processing at predetermined time intervals (e.g., every 10 seconds). Referring to FIG. 10, the capture processing is explained below. FIG. 10 is a flowchart of one example of the capture processing according to the present embodiment.

(Step S131) The review processing unit 120 captures an image of the screen area to be captured from the screen area of the display unit 14. For example, the screen area to be captured is the content area CR of the area of the review app window WR.

(Step S132) The review processing unit 120 saves the file of the image captured in step S131 (captured image file) in the memory unit 23 (see FIG. 7). Then the procedure shifts to step S105 in FIG. 9.

(Step S105) The review processing unit 120 determines the similarity between the captured image captured this time and the captured image captured previously. For example, the review processing unit 120 determines the similarity between the captured image captured this time and the captured image captured previously, and the procedure proceeds to step S107.

(Step S107) Then, if the review processing unit 120 determines in step S105 that the similarity is less than a predetermined threshold, it determines that the content of the shared material has been changed, and sets the captured image captured this time as the review target (sets the review target flag to "1"). If the review processing unit 120 determines in step S105 that the similarity is equal to or greater than the predetermined threshold, it determines that the content of the shared material has not been changed, and does not set the captured image captured this time as the review target (sets the review target flag to "0"). The review processing unit 120 does not determine the first captured image because there is no captured image captured before whose similarity is to be determined, and sets it as the review target (sets the review target flag to "1"). After the review processing unit 120 sets any review target, the procedure proceeds to step S109.

(Step S109) The review processing unit 120 executes character information acquisition processing that acquires character information on the characters recognized from the captured image set as the review target. Referring to FIG. 11, the character information acquisition processing is explained below. FIG. 11 is a flowchart of one example of the character information acquisition processing according to the present embodiment.

(Step S191) The review processing unit 120 determines whether or not the captured image is set as the review target in step S107. If it is not set as the review target (when the review target flag is set to "0") (NO), the review processing unit 120 does not acquire the character information and ends the procedure. The procedure then proceeds to step S111 in FIG. 9. If the captured image is set as the review target (when the review target flag is set to "1") in step S107 (YES), the review processing unit 120 proceeds the procedure to step S192.

(Step S192) The review processing unit 120 instructs the character recognition processing unit 112 to perform character recognition processing for the captured image set as the review target. Then the procedure shifts to step S193.

(Step S193) The character recognition processing unit 112 recognizes a character area from the captured image by the function of OCR in accordance with the instruction from the review processing unit 120, and returns character information including text data and position data of the recognized characters to the review processing unit 120. Then the procedure shifts to step S194.

(Step S194) The review processing unit 120 acquires the character information on the characters recognized from the captured image by the character recognition processing unit 112, and the procedure proceeds to step S195.

(Step S195) The review processing unit 120 associates the character information acquired in step S194 with the captured image and saves it in the memory unit 23 as a character information file. For example, the review processing unit 120 associates the file name of the captured image with the text data and position data of the characters recognized from the captured image, and saves it as a character information file in the memory unit 23. (see FIG. 8). Then the procedure shifts to step S111 in FIG. 9.

(Step S111) The review processing unit 120 determines whether or not a review instruction to display the captured image has been received by user operation. If the review processing unit 120 determines that a review instruction has been received (YES), it proceeds the procedure to step S113. If the review processing unit 120 determines that no review instruction has been received (NO), it proceeds the procedure to step S115.

(Step S113) The review processing unit 120 displays the captured image selected as the review instruction by the user's operation on the display unit 14 (the window WR of the review app illustrated in FIGS. 2 to 4) in association with the character information. For example, the user's operation to select a captured image as a review instruction is the user's operation with the slider SD1 illustrated in FIG. 3.

(Step S115) The review processing unit 120 determines whether or not to end the capture. For example, when an operation to end the capture is performed by the user or when detecting that the video conference app releases the microphone 241 or speaker 242, the review processing unit 120 determines that a capture end event has occurred (YES) and the procedure proceeds to step S117 without continuing the capture processing (ending the capture processing). When the review processing unit 120 determines that no capture end event has occurred (NO), the procedure returns to step S103 to continue the capture processing at predetermined time intervals.

(Step S117) The review processing unit 120 determines whether or not an operation to end the review app has been performed by the user. If the review processing unit 120 determines that no operation to end the review app has been performed by the user (NO), the procedure returns to step S111 to display a captured image in response to the review instruction. If the review processing unit 120 determines that an operation to end the review app has been performed by the user (YES), it closes the review app and ends the review processing.

If the review processing unit 120 determines that a capture end event has occurred in step S115 (YES), it may end the review app with the ending of the capture processing and end the review process.

Summary of First Embodiment

As described above, the information processing apparatus 10 according to the present embodiment includes a memory (e.g., the main memory 12) that temporarily stores video data received from another information processing apparatus via a network, and a processor (e.g., the CPU 11) that executes processing based on the video data stored in the memory. The CPU 11 includes the review processing unit 120 that is a functional configuration implemented by executing the review app. The review processing unit 120 performs capture processing that captures the screen area (e.g., content area CR) including at least a part of the video in the screen area of the display unit 14, on which the video of the video data received from another terminal device (information processing apparatus) and stored in the memory is displayed, as a captured image file (still image file) at predetermined time intervals. While continuing the capture processing of capturing at predetermined time intervals, the review processing unit 120 performs character information acquisition processing that acquires character information on the characters recognized from at least some of the captured images in the series of captured image files captured by the capture processing, and stores the character information for each captured image.

With this configuration, the information processing apparatus 10 conveniently allows the user to obtain character information contained in a captured image from the captured images received from another terminal device (information processing apparatus) and captured as images. For example, the information processing apparatus 10 allows the participants of a video conference to obtain words, characters, or sentences described in the material shared during the online video conference without typing, thus enhancing the convenience of the online video conference.

The review processing unit 120 performs display control processing that displays at least some of the captured images on the display unit 14 in association with character information while continuing the capture at predetermined time intervals.

With this configuration, the information processing apparatus 10 allows the user (e.g., a participant in a video conference) to easily obtain words, characters or sentences in the material being shared during the video conference, because the information processing unit 10 displays the captured images received from another terminal device (information processing apparatus) in association with character information.

The review processing unit 120 also acquires, as character information, character data of characters recognized from at least some of the images and position data of the location where these characters were recognized. Then, when displaying at least some of the images on the display unit 14 in association with the character information, the review processing unit 120 displays the position in the captured image where the characters were recognized in a specific display mode (e.g., highlighted). The specific display mode is not limited to the highlight display, and any display mode can be used as long as it can be distinguished from the unrecognized part, including a display in a specific color or an underlined display.

With this configuration, the information processing apparatus 10 allows the user (e.g., a participant in a video conference) to easily recognize the portion (portion in association with character information) that is recognized as characters in the captured image.

The review processing unit 120 also performs provisioning processing that provides the recognized characters in accordance with the user's operation at the position where the characters were recognized in the captured image displayed on the display unit 14 by the display control processing.

With this configuration, the information processing apparatus 10 conveniently allows the user (e.g., a participant in a video conference) to use the selected characters (text data) simply by selecting the characters in the captured image displayed on the display unit 14.

In the provisioning processing, the review processing unit 120 also provides the characters recognized from the captured image to be copiable.

With this configuration, the information processing apparatus 10 conveniently allows the user (e.g., a participant in a video conference) to copy the selected characters (text data) simply by selecting the characters in the captured image displayed on the display unit 14.

In the provisioning processing, the review processing unit 120 also provides the characters recognized from the captured image to be searchable by the browser.

With this configuration, the information processing apparatus 10 conveniently allows the user (e.g., a participant in a video conference) to search the selected characters (text data) on the web simply by selecting the characters in the captured image displayed on the display unit 14.

In the provisioning processing, when the characters recognized from the captured image indicate a URL, the review processing unit 120 provides the resource (e.g., webpage) identified by the URL so that the resource can be displayed on the display unit 14.

With this configuration, the information processing apparatus 10 conveniently allows the user (e.g., a participant in a video conference) to display the webpage of the selected URL simply by selecting the URL in the captured image displayed on the display unit 14.

In the display control processing, the review processing unit 120 displays a user interface on the display unit 14 (e.g., the slider SD1 in FIG. 3) that allows selection of each of a series of captured image files captured by the capture processing corresponding to their captured order, and displays, on the display unit 14, a captured images of the captured image file selected in response to user's operation with this user interface.

With this configuration, the information processing apparatus 10 allows the user (a participant) to easily select and display the page that the user wants to look back on from the material shared by the other user (presenter) at the conference, and easily obtain the character information (text data) in the page.

In the capture processing, the review processing unit 120 captures the content area CR (an example of a specific area) in the video within the screen area of the display unit 14.

With this configuration, the information processing apparatus 10 allows the user to acquire character information by capturing only the necessary area of the video displayed on the display unit 14 (e.g., the portion of the material being shared in the video conference), thereby eliminating character recognition processing for unnecessary image areas and reducing the amount of data for character recognition processing (reducing the processing load).

Each time the capture processing conducts the capture, the review processing unit 120 also performs similarity determination processing that compares the captured image in the captured image file captured this time with the captured image in the captured image file captured previously to determine their similarity. Then, the review processing unit 120 excludes a captured image of the captured image file whose similarity to the captured image of the previously captured image file is determined by the similarity determination processing to be greater than a predetermined threshold from the target of acquiring character information by the character information acquisition processing and from the display target to be displayed on the display unit 14 by the display control processing.

With this configuration, the information processing apparatus 10 facilitates the paging process when the user reviews the material, because this eliminates the duplication of the captured images on the same page and only one captured image per page will be reviewed. The information processing apparatus 10 does not perform duplicated character recognition processing for the captured images on the same page, thereby reducing the amount of data for character recognition processing (reducing the processing load).

The control method for the information processing apparatus 10 includes: the step where the review processing unit 120 captures a screen area including at least a part of the video in the screen area of the display unit 14, on which video of the video data received from another terminal device (information processing apparatus) and stored in the memory (e.g., main memory 12) is displayed, as a captured image file (still image file) at predetermined time intervals; and while continuing the capturing at predetermined time intervals, the review processing unit 120 acquires character information on the characters recognized from at least some of the captured images in the series of captured image files captured by the capturing step, and stores the character information for each captured image.

With this configuration, the information processing apparatus 10 conveniently allows the user to obtain character information contained in a captured image from the captured images received from another terminal device (information processing apparatus) and captured as images. For example, the information processing apparatus 10 allows the participants of a video conference to obtain words, characters, or sentences described in the material shared during the online video conference without typing, thus enhancing the convenience of the online video conference.

Second Embodiment

Next, the following describes a second embodiment of the present invention.

The review app described in the first embodiment may not only capture the video of the video conference app as a still image file, but also generate a video (moving image) file in which the video is recorded. That is, the review app may perform capturing every predetermined time intervals during the period from the start of recording to the end of recording of the video file in which the video data received from another terminal device (information processing apparatus) by the video conference app is recorded.

For example, the review app (capture unit 121) starts recording in response to the occurrence of a capture start event in step S101 of the review processing illustrated in FIG. 9 and ends the recording in response to the occurrence of a capture end event in step S115 to generate a video file. Note that another application, other than the review app, is available, which records video of the video conference app (i.e., captures video of the screen). A video file may be generated using this other application.

When a video file is generated, the file name is typically automatically generated, including the date or the number according to the order of generation. As the number of video files increases, however, the user will not be able to speedily distinguish which is the desired file. Conventional methods search for a video file only with the file name, the creation date and time, or updating date and time of the file, which may make it difficult for the user to find the desired file.

Figure 12:
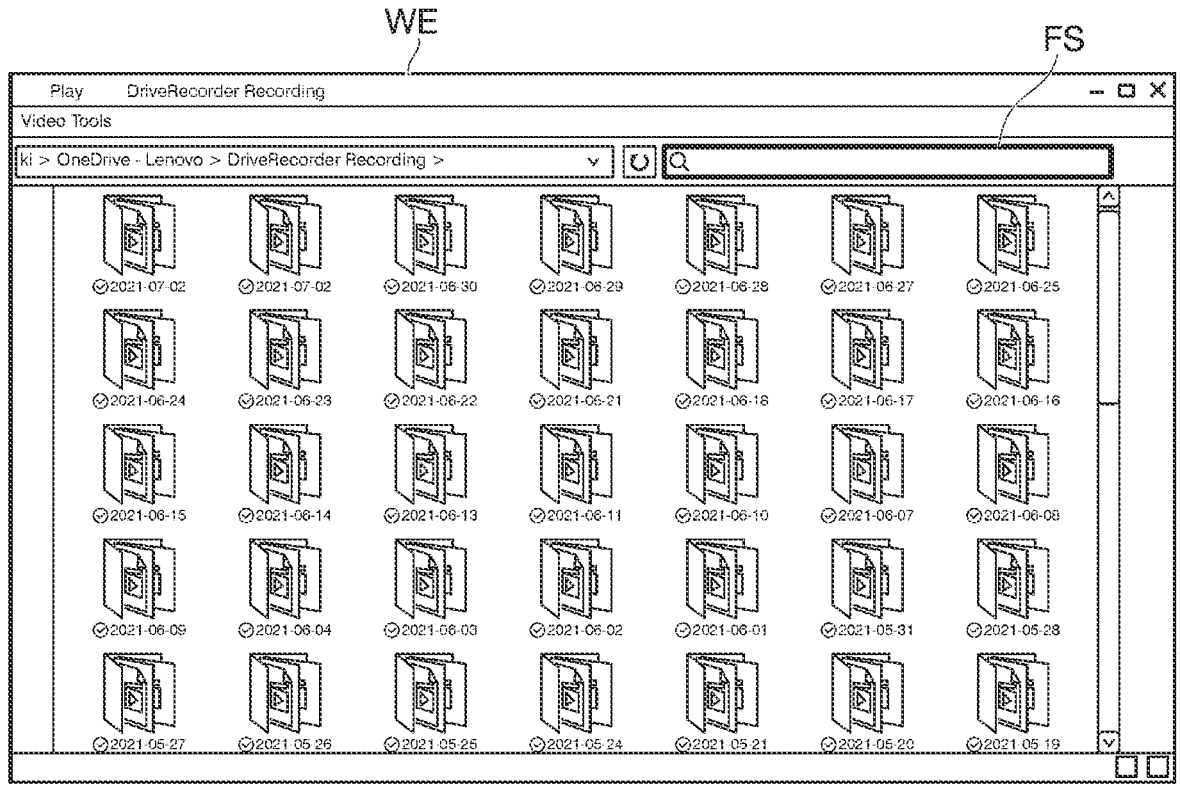
FIG. 12 illustrates an example of file management app according to a second embodiment.

FIG. 12 illustrates an example of a file management app capable of searching for files. This drawing illustrates an example of the file management app window WE displayed on the display unit 14. In one example, the file management app is Windows (registered trademark) Explorer, which enables browsing and searching of files and folders. This application allows the user to search for a file by letting them enter the file name or the date and time of the file they want to search for in the search box FS. In this embodiment, the user is also allowed to search for a file using the character information recorded in the video file.

Specifically, the review app extracts a keyword from the text data of the character information recognized as characters from the captured images described in the first embodiment, and saves the extracted keyword in metadata tags (Tags) of the video file. This allows the user to enter a word that they want to search for in the search box FS, and thus search for a video file by a keyword search using the entered characters. Note that the captured image is not limited to those captured at predetermined time intervals as the conference progresses during execution of the video conference app as described in the first embodiment, but may also be those captured at predetermined time intervals while playing back a video file later.

Figure 13:
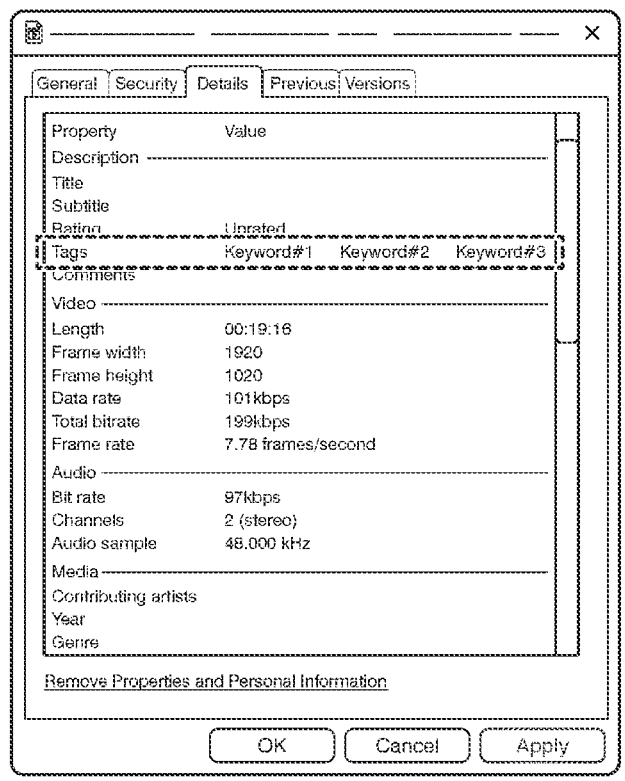
FIG. 13 illustrates an example of metadata of a video file according to the second embodiment.

FIG. 13 illustrates an example of metadata for a video file. This drawing is an example of the property screen of the video file. The extracted keywords are saved in "Tags". The number of stored keywords may be one or more. All of the extracted keywords may be stored in "Tags", or the number of keywords stored in "Tags" may be limited.

Next, the following describes a functional configuration implemented by execution of the review app according to the present embodiment that enables a search of a video file with character information.

Figure 14:
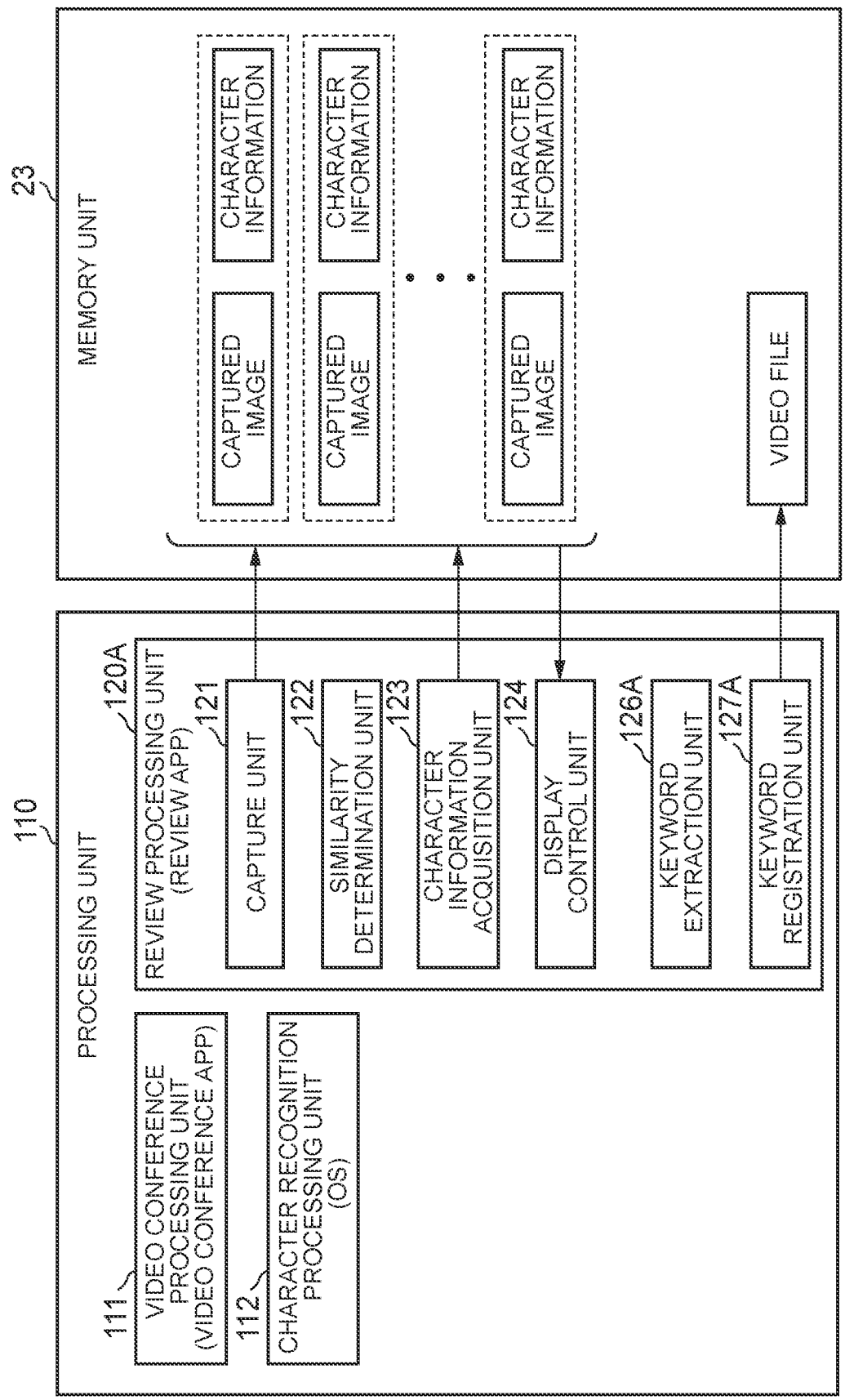
FIG. 14 is a block diagram illustrating one example of the functional configuration of the information processing apparatus according to the second embodiment.

FIG. 14 is a block diagram illustrating one example of the functional configuration of the information processing apparatus 10 according to the present embodiment. The appearance and hardware configuration of the information processing apparatus 10 according to the present embodiment are the same as those in FIGS. 1 and 5. In FIG. 14, the review processing unit 120A is a functional configuration implemented through the execution of the review app according to the present embodiment. A video conference processing unit 111 and a character recognition processing unit 112 are similar to the video conference processing unit 111 and the character recognition processing unit 112 illustrated in FIG. 6.

The review processing unit 120A includes a capture unit 121, a similarity determination unit 122, a character information acquisition unit 123, a display control unit 124, a keyword extraction unit 126A, and a keyword registration unit 127A. The basic configurations of the capture unit 121, the similarity determination unit 122, the character information acquisition unit 123, and the display control unit 124 are the same as those shown in FIG. 6, and the description thereof will be omitted.

The keyword extraction unit 126A extracts a keyword from the characters included in the character information acquired by the character information acquisition unit 123. To extract a keyword, a technology such as TF-IDF can be applied. TF-IDF is a method of evaluating the importance of words contained in a sentence based on two indexes, the term frequency (TF) of the words and the inverse document frequency (IDF) of the words. Any known technology can be applied as the method for extracting keywords.

The keyword registration unit 127A associates the character information acquired by the character information acquisition unit 123 with the video file. For example, the keyword registration unit 127A stores the keyword extracted by the keyword extraction unit 126A in the metadata tags (Tags) of the video file to associate the keyword with the video file.

Summary of Second Embodiment

As described above, the information processing apparatus 10 of the present embodiment includes the review processing unit 120A that is a functional configuration implemented through the execution of the review app. The review processing unit 120A performs capturing every predetermined time intervals during the period from the start of recording to the end of recording of a video file in which the video data received from another terminal device (information processing apparatus) by the video conference app is recorded. Then, the review processing unit 120A acquires character information on the characters recognized from at least some of the captured images in the series of captured image files, and associates the acquired character information with the video file.

With this configuration, the information processing apparatus 10 conveniently allows the user to search for a video file by character search, and thus easily find their desired video file.

For example, the review processing unit 120A performs keyword extraction processing that extracts a keyword from the characters included in the acquired character information, and associates the extracted keyword with the video file.

With this configuration, the information processing apparatus 10 allows the user to search for a video file by keyword search, and thus easily find their desired video file.

In one example, the review processing unit 120A stores the extracted keyword in the metadata of the video file to associate the keyword with the video file.

With this configuration, the information processing apparatus 10 allows the user to search for a video file by keyword search using a general-purpose file management application such as Explorer, and thus easily find their desired video file.

Instead of extracting a keyword from the characters in the character information recognized from the captured image, the review processing unit 120A may store and associate some character information (e.g., only the first line or only the first word of the first line) in the metadata of the video file. If a title, for example, is described on each page of the material shared in the video conference, this configuration enables searching by the title.

Third Embodiment

Next, the following describes a third embodiment of the present invention.

The present embodiment describes an example of the method for searching a video file as in the second embodiment. The present embodiment is different from the second embodiment in that it enables a search of the scene of the video when the video file is played back.

Figure 15:
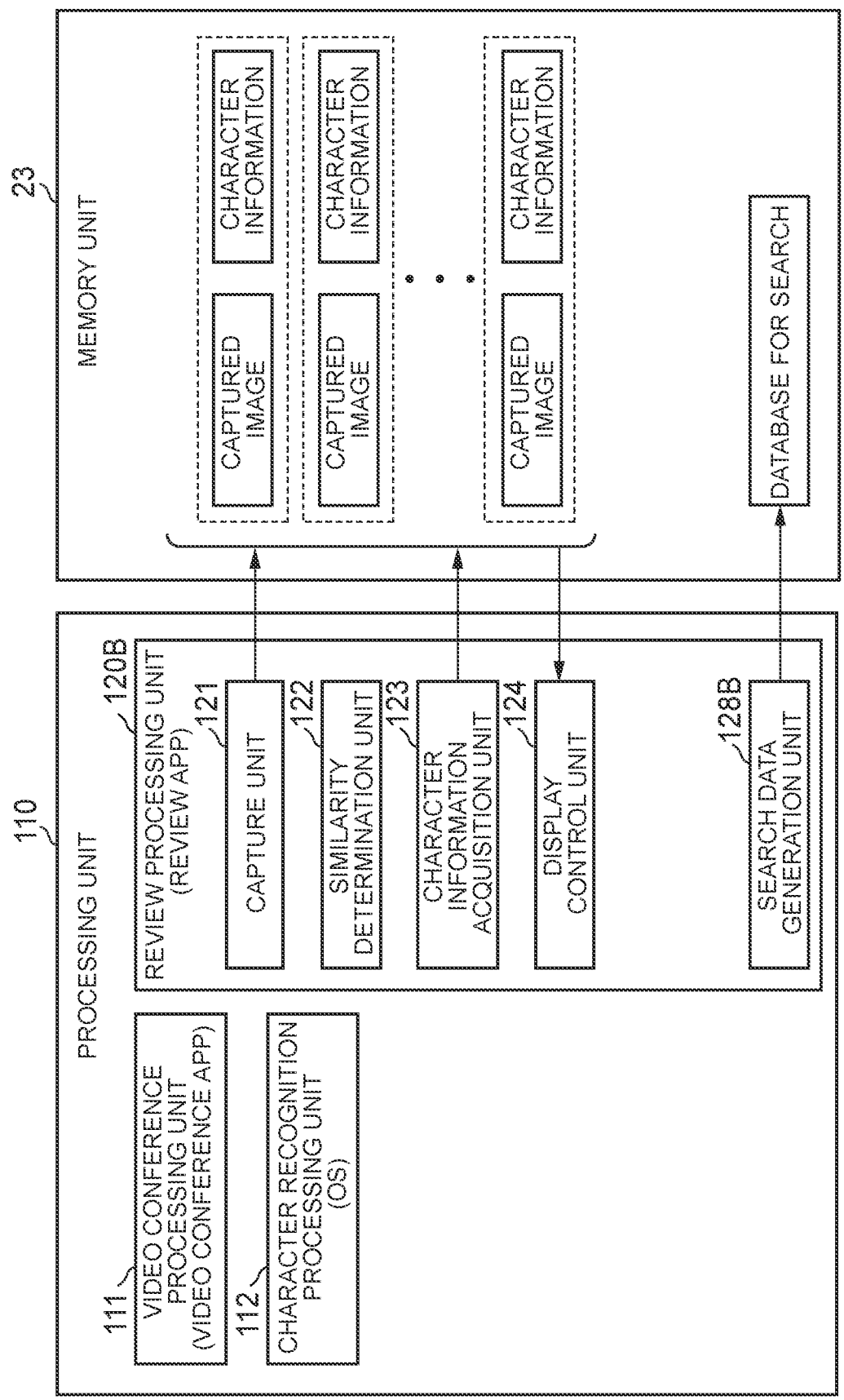
FIG. 15 is a block diagram illustrating one example of the functional configuration of the information processing apparatus according to the third embodiment.

FIG. 15 is a block diagram illustrating one example of the functional configuration of the information processing apparatus 10 according to the present embodiment. The appearance and hardware configuration of the information processing apparatus 10 according to the present embodiment are the same as those in FIGS. 1 and 5. In FIG. 15, the review processing unit 120B is a functional configuration implemented through the execution of the review app according to the present embodiment. A video conference processing unit 111 and a character recognition processing unit 112 are similar to the video conference processing unit 111 and the character recognition processing unit 112 illustrated in FIG. 6.

The review processing unit 120B includes a capture unit 121, a similarity determination unit 122, a character information acquisition unit 123, a display control unit 124, and a search data generation unit 128B. The basic configurations of the capture unit 121, the similarity determination unit 122, the character information acquisition unit 123, and the display control unit 124 are the same as those shown in FIG. 6, and the description thereof will be omitted.

The search data generation unit 128B generates data for search, this data associating a video file, the elapsed time from the start of recording the video file to the capture for each captured image file, and text data of the characters included in the character information recognized as characters from the captured image for the captured image file with each other. The search data generation unit 128B stores the generated data for search in a database for search of the memory unit 23.

Figures 16, 17:
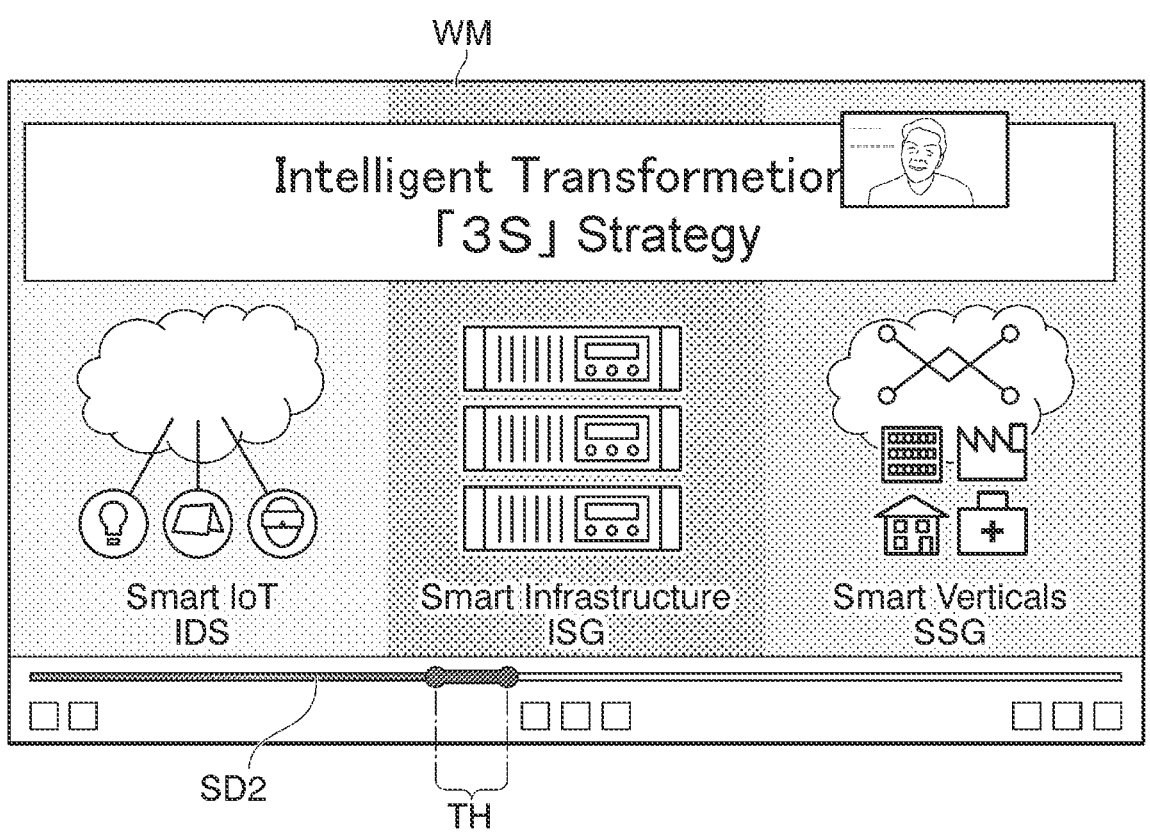
FIG. 16 illustrates an example of a database for search according to the third embodiment.
FIG. 17 illustrates an example of the display of a search result on the video playback screen according to the third embodiment.

FIG. 16 illustrates an example of the database for search stored in the memory unit 23. The database for search stores the file name of a video file, the elapsed time, and the extracted text data that are associated with each other. The path of the file may be added to the file name. The elapsed time is the time elapsed from the start of the video file recording to the capture of each captured image file. For example, the text data associated with the elapsed time "00:00:00" is the text data of characters recognized from the captured image that was captured at the beginning of the video file recording. The text data associated with the elapsed time "00:18:25" is the text data of characters recognized from the captured image that was captured 18 minutes and 25 seconds after the beginning of the video file recording. The file name of the captured image file that is captured at every elapsed time may be further associated and stored.

For example, when the characters "3S" are searched as a search word, the searching finds that "3S" is recorded (e.g., the word is displayed in the material shared by the video conference app) in the video of the video file during the period TH from "00:18:25" to "00:19:50".

FIG. 17 illustrates an example of the display of a search result on the video playback screen. This drawing illustrates an example of the window screen WM of the video playback app that plays back a video file and displays the video on the display unit 14. The function of this video application may be one of the functions of the review app or may be a dedicated application. When the function of the video application is one of the functions of the review app, the display control unit 124 further has a function of playing back and displaying a video file. For example, in response to a user's operation to play back a video file, the display control unit 124 plays back the video file and displays the video being played back on the window screen WM. The window screen WM also displays a slider SD2 that indicates a playback position between the start and the end of the video. The display control unit 124 displays a portion of the slider SD2 that corresponds to the period TH where the search word "3S" is displayed" in a display mode different from other periods (e.g., displayed in a different color or with a thick bar). The display control unit 124 also displays the part of the search word "3S" of the video being played back in a specific display mode (e.g., highlighted).

Summary of Third Embodiment

As described above, the information processing apparatus 10 of the present embodiment includes the review processing unit 120B that is a functional configuration implemented through the execution of the review app. The review processing unit 120B generates data for search (an example of associated data), this data associating a video file, the elapsed time from the start of recording the video file to the capture for each captured image file, and characters (text data) included in the character information recognized from the captured image for the captured image file with each other.

With this configuration, the information processing apparatus 10 conveniently allows the user to search for the scene from the video that records characters while setting the characters in the video recorded in the video file as the search word.

As in the second embodiment, the review processing unit 120B may extract a keyword from character information and associate the extracted keyword with the video file and elapsed time. For example, the review processing unit 120B may perform keyword extraction processing that extracts a keyword from the characters included in the character information acquired by the character information acquisition unit 123, and generate data for search (an example of associated data), this data associating a video file, the elapsed time from the start of recording the video file to the capture for each captured image file, and the keyword included in the character information recognized as characters from the captured image for the captured image file with each other.

Fourth Embodiment

The following describes a fourth embodiment of the present invention.

The present embodiment describes an example of recognizing subtitles (live captions) of the video conference app as characters and using the content of the conversation of the conference as characters (text data). Some video conference apps have a live captioning function of subtitling the voice of a user (conference participant) speaking in the conference.

Figure 18:
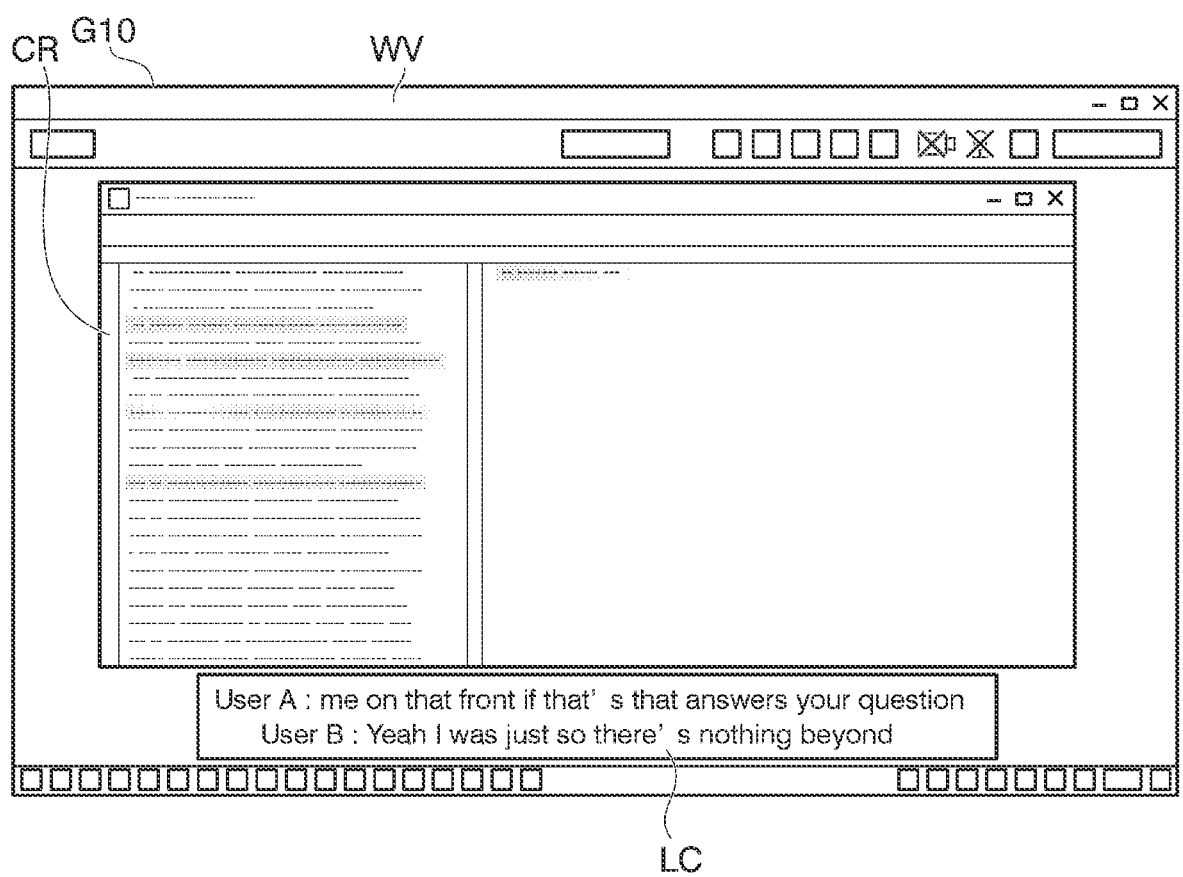
FIG. 18 illustrates a display example of the video conference app according to a fourth embodiment.

FIG. 18 illustrates a display example of the video conference app according to the present embodiment. The window WV of the video conference app is displayed in full screen on the display screen G10 of the display unit 14 of the information processing apparatus 10. In a subtitle display area LC, the voice of the user speaking at the conference is subtitled by the live caption function. In the first to third embodiments, the review app captures the content area CR at predetermined time intervals, and in the present embodiment, the review app captures this subtitle display area LC at predetermined time intervals. The subtitle display area LC that is a capture target may be preset depending on the use of the video conference app, or the user may set through the operation to specify the range of the subtitle display area LC that is a capture target.

In the example of this drawing, two lines of subtitles are displayed in the subtitle display area LC. The upper line is the confirmed subtitles, and the lower line is the subtitles being updated according to the current voice. The subtitles being updated may be modified or changed from moment to moment depending on the content of the voice, and only the subtitles in the upper line are subject to character recognition.

In the present embodiment, the subtitle display area LC shows an example of displaying two lines of subtitles, but the subtitles may be three or more lines. In the present embodiment, the upper line (top line) of the subtitle display area LC is a confirmed line of the subtitles. The present embodiment is not limited to this, and the lower line (bottom line) may be a confirmed line of the subtitles.

Figure 19:
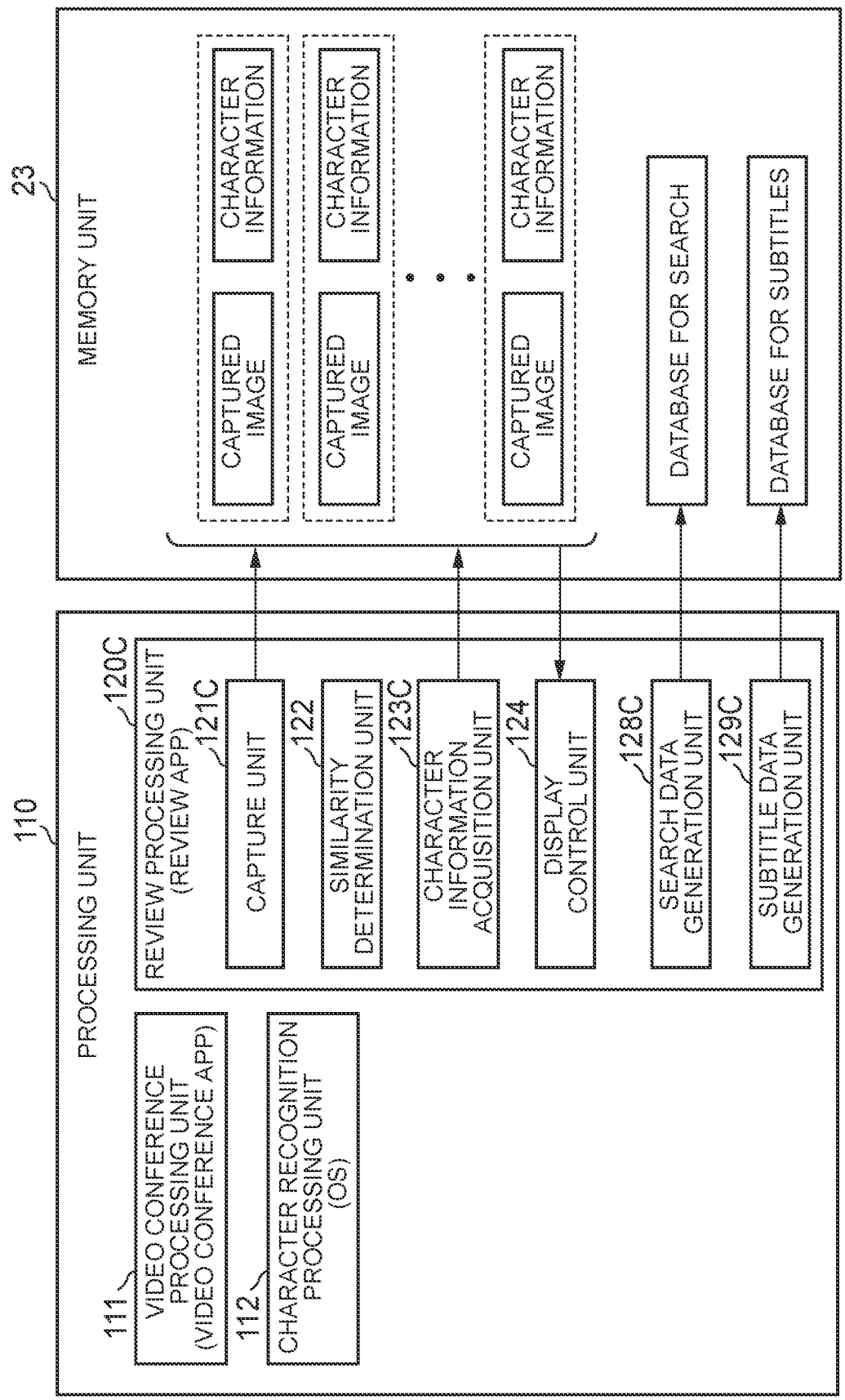
FIG. 19 is a block diagram illustrating one example of the functional configuration of the information processing apparatus according to the fourth embodiment.

FIG. 19 is a block diagram illustrating one example of the functional configuration of the information processing apparatus 10 according to the present embodiment. The appearance and hardware configuration of the information processing apparatus 10 according to the present embodiment are the same as those in FIGS. 1 and 5. In FIG. 19, the review processing unit 120C is a functional configuration implemented through the execution of the review app according to the present embodiment. A video conference processing unit 111 and a character recognition processing unit 112 are similar to the video conference processing unit 111 and the character recognition processing unit 112 illustrated in FIG. 6. The video conference processing unit 111 has a live captioning function that recognizes voice as characters and converts it into characters (subtitling).

The review processing unit 120C includes a capture unit 121C, a similarity determination unit 122, a character information acquisition unit 123C, a display control unit 124, a search data generation unit 128C, and a subtitle data generation unit 129C.

The capture unit 121C captures a subtitle display area LC (as a captured image file (still image file)), in which subtitles that are based on audio data received from another terminal device (information processing apparatus) and are converted into characters by the video conference app are displayed, at predetermined time intervals. Similarly, the similarity determination unit 122 determines the similarity between the captured images and determines whether or not to make it as a review target. This allows the text data of subtitles to be obtained without duplication.

The character information acquisition unit 123C acquires character information recognized from a portion (e.g., the subtitles of the upper confirmed line) of the subtitles included in a captured image (captured image set as a review target) of the subtitle display area LC that is captured by the capture unit 121C, and stores the character information (text data of the subtitles) for each captured image.

The search data generation unit 128C associates the character information acquired by the character information acquisition unit 123C with the video file. For example, the search data generation unit 128C generates data for search, this data associating a video file, the elapsed time from the start of recording the video file to the capture for each still image file, and character information (text data of the subtitles) recognized as characters from the captured image for the captured image file with each other. The search data generation unit 128C stores the generated data for search in a database for search of the memory unit 23.

For example, for the database for search, text data of the subtitles may be stored instead of the text data of the database for search illustrated in FIG. 16 (text data prepared by recognizing characters from the content area CR), or the text data of subtitles may be stored in addition to the text data of the database for search illustrated in FIG. 16.

The subtitle data generation unit 129C generates a single subtitle data file that collects the character information (subtitle text data), in which a part of the subtitles for each captured image acquired by the character information acquisition unit 123C is recognized as characters, in the order of the capturing of the captured images. The subtitle data generation unit 129C stores the generated subtitle data file in the memory unit 23.

FIG. 20 illustrates an example of the subtitle data file according to the present embodiment. As illustrated in the drawing, the subtitle data file includes the text data of the subtitles displayed by the live caption function of the video conference app that are arranged in chronological order from top to bottom or from bottom to top. Although the subtitles displayed in the live captioning function of the video conference app sequentially disappear from the display and are not left behind, the review app of the present embodiment automatically converts the subtitles to text to keep them.

Summary of Fourth Embodiment

As described above, the information processing apparatus 10 according to the present embodiment includes a memory (e.g., the main memory 12) that temporarily stores audio data received from another information processing apparatus via a network, and a processor (e.g., the CPU 11) that executes processing based on the audio data stored in the memory. The CPU 11 includes the review processing unit 120C that is a functional configuration implemented by executing the review app. The review processing unit 120C performs capture processing that captures the screen area (e.g., subtitle display area LC) that displays subtitles in the screen area of the display unit 14 on which the subtitles, which are obtained by converting audio data received from another terminal device (information processing apparatus) and stored in the memory into characters, are displayed as a captured image file (still image file) at predetermined time intervals. The review processing unit 120C also performs character information acquisition processing that acquires character information (text data of subtitles) on the characters recognized from a part of the subtitles included in at least some of the captured images in the series of captured image files captured by the capture processing, and stores the character information for each captured image.

With this configuration, the information processing apparatus 10 conveniently leaves the subtitles displayed by the live captioning function as text. For example, the information processing apparatus 10 automatically leaves the content of a participant speaking with the video conference app as text, and thus enhances the convenience of the online video conference.

The review processing unit 120C performs file generation processing that generates a single subtitle data file (an example of a data file) that collects the character information (subtitle text data), in which a part of the subtitles for each captured image acquired is recognized as characters, in the order of the capturing of the captured images.

With this configuration, the information processing apparatus 10 conveniently generates a data file, in which the subtitles displayed by the live captioning function as text are saved. For example, the information processing apparatus 10 automatically generates text data, which is prepared by arranging the content of a participant speaking with the video conference app in the order of utterance, and thus enhances the convenience of the online video conference.

In the capture processing, the review processing unit 120C performs capturing every predetermined time intervals during the period from the start of recording to the end of recording of the video file in which the video data received from another terminal device (information processing apparatus) is recorded.

The review processing unit 120C also performs association processing that associates the acquired character information (subtitle text data) with the video file.

With this configuration, the information processing apparatus 10 conveniently allows the user to search for a video file, in which the voice corresponding to the characters is recorded, by character search, and thus easily find their desired video file.

For example, in the association processing, the review processing unit 120C generates data for search (an example of associated data), this data associating a video file, the elapsed time from the start of recording the video file to the capture for each captured still image file, and characters (subtitle text data) included in the character information recognized as characters from the captured image for the captured image file with each other.

With this configuration, the information processing apparatus 10 conveniently allows the user to search for the scene (i.e., the scene where the audio corresponding to the characters is recorded) of video in which characters are recorded from the video while setting the characters (text data of subtitles) in the video recorded in the video file as the search word.

The control method for the information processing apparatus 10 includes: a capture step in which the review processing unit 120C captures the screen area (e.g., subtitle display area LC) that displays subtitles in the screen area of the display unit 14 on which the subtitles, which are obtained by converting audio data received from another terminal device (information processing apparatus) and stored in the memory (e.g., the main memory 12) into characters, are displayed as a captured image file (still image file) at predetermined time intervals; and a storage step in which the review processing unit 120C acquires character information (text data of subtitles) on the characters recognized from a part of the subtitles included in at least some of the captured images in the series of captured image files captured by the capture process, and stores the character information for each captured image.

With this configuration, the information processing apparatus 10 conveniently leaves the subtitles displayed by the live captioning function as text. For example, the information processing apparatus 10 automatically leaves the content of a participant speaking with the video conference app as text, and thus enhances the convenience of the online video conference.

That is a detailed descriptions on the embodiments of the present invention with reference to the drawings. The specific configuration of the present invention is not limited to the above-described embodiments, and also includes design modifications or the like within the scope of the present invention. The configurations described in the above embodiments can be combined freely.

In each of the above embodiments, the timing of capturing at least a part of the window WV of the video conference app is not limited to during the execution of the video conference app (during the conference). After the end of the conference and during execution of the video conference app, the video that plays back the video file in which at least a part of the window WV was recorded may be captured at predetermined time intervals. When the video file being played back is captured, the video file is not limited to the video file of the video conference app, and may be a video file created for other purposes. The video being recorded in the video file or the video when the recorded video file is played back may be screen-captured separately.

If the area recognized as characters from the captured image is smaller than a preset size, it may not be acquired as character information.

The above-stated information processing apparatus 10 internally includes a computer system. A program to implement the functions of various configurations of the information processing apparatus 10 as stated above may be stored in a computer-readable recording medium, and the processing at the various configurations of the information processing apparatus 10 may be performed by causing the computer system to read and execute the program stored in this recording medium. "Causing the computer system to read and execute the program stored in the recording medium" includes installing of such a program in the computer system. The "computer system" here includes an OS and hardware, such as peripherals. The "computer system" may include a plurality of computer devices connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the information processing apparatus 10. Alternatively, different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions that the information processing apparatus 10 of the above-described embodiments has may be implemented as an integrated circuit, such as a LSI (Large Scale Integration). Each of the functions as stated above may be implemented as one processor, or a part or all of the functions may be implemented as one processor in an integrated manner. A technology for integrated circuit is not limited to a LSI, and an integrated circuit may be realized using a dedicated circuit or a general-purpose processor. If a technology for integrated circuit that replaces LSIs becomes available with the development of semiconductor technology, an integrated circuit based on such a technology may be used.

The above embodiments describe the example of the information processing apparatus 10 that is a laptop PC. In another embodiment, the information processing apparatus 10 may be a desktop type or tablet type PC, a smartphone, a game machine, or an electronic device dedicated to video conferencing. The imaging unit 27 is not limited to that built into the information processing apparatus 10, which may also be a peripheral device connected via USB (universal serial bus) or other means. The display unit 14 is not limited to that built into the information processing apparatus 10, which may also be a peripheral device connected via HDMI (registered trademark), USB (Universal Serial Bus) or other means.

DESCRIPTION OF SYMBOLS

10 information processing apparatus
101 first chassis
102 second chassis
103 hinge mechanism
11 CPU
12 main memory
13 video subsystem
14 display unit
21 chipset
22 BIOS memory
23 memory unit
24 audio system
25 communication unit
26 USB connector
27 imaging unit
31 embedded controller
32 keyboard
33 power circuit
34 battery
35 sensor
110 processing unit
111 video conference processing unit
112 character recognition processing unit
120, 120A, 120B, 120C review processing unit
121, 121C capture unit
122 similarity determination unit
123 character information acquisition unit
124 display control unit
125 character information provision unit
126A keyword extraction unit
127A keyword registration unit
128B, 128C search data generation unit
129C subtitle data generation unit

What is claimed is:

1. An information processing apparatus comprising:
a memory that temporarily stores video data received from another information processing apparatus via a network; and
a processor configured to:
  execute processing based on the video data stored in the memory,
  perform, at predetermined time intervals, capture processing of capturing a screen area of a display on which a video of the video data stored in the memory is displayed, wherein the captured screen area includes at least a part of the video as a still image file,
  perform, while continuing the capture processing at predetermined time intervals, character information acquisition processing of acquiring character information on characters recognized from at least a part of images of a series of still image files captured by the capture processing, and
  store the character information for each image,
wherein while continuing the capture processing at predetermined time intervals, the processor further performs display control processing of displaying the at least part of the images associated with the character information on the display,
wherein each time in the capture processing, the processor further performs similarity determination processing of comparing an image of a still image file captured this time with an image of a still image file captured previously to determine a similarity, and
wherein the processor excludes an image of a still image file whose similarity to an image of a still image file captured previously is determined by the similarity determination processing to be equal to or greater than a predetermined threshold from a target of acquiring the character information by the character information acquisition processing and from a display target of displaying on the display by the display control processing.

2. The information processing apparatus according to claim 1, wherein
in the character information acquisition processing, the processor acquires, as the character information, character data of characters recognized from the at least the part of the images and position data of a location where the characters are recognized, and
in the display control processing, when displaying the at least a part of the images on the display in association with the character information, the processor displays a position in the image where the characters are recognized in a specific display mode.

3. The information processing apparatus according to claim 2, wherein the processor performs provisioning processing of providing the recognized characters in accordance with user's operation at the position where the characters are recognized in the image displayed on the display by the display control processing.

4. The information processing apparatus according to claim 3, wherein in the provisioning processing, the processor provides the recognized characters to be copiable.

5. The information processing apparatus according to claim 3, wherein in the provisioning processing, the processor provides the recognized characters to be searchable by a browser.

6. The information processing apparatus according to claim 3, wherein in the provisioning processing, when the recognized characters indicate a uniform resource locator (URL), the processor provides a resource identified by the URL to be displayable on the display.

7. The information processing apparatus according to claim 1, wherein in the display control processing, the processor displays a user interface on the display that allows selection of each of a series of still image files captured by the capture processing corresponding to a captured order, and displays, on the display, an image of a still image file selected in response to user's operation with the user interface.

8. The information processing apparatus according to claim 1, wherein in the capture processing, the processor captures a specific area in the video within the screen area of the display.

9. The information processing apparatus according to claim 1, wherein
in the capture processing, the processor performs the capturing at predetermined time intervals during a period from start to end of recording of a video file in which the video data received from the other information processing apparatus is recorded, and
the processor further performs association processing of associating character information acquired by the character information acquisition processing with the video file.

10. The information processing apparatus according to claim 9, wherein
the processor further performs keyword extraction processing of extracting a keyword from characters included in the character information acquired by the character information acquisition processing, and
the processor associates the keyword with the video file in the association processing.

11. The information processing apparatus according to claim 10, wherein in the association processing, the processor stores the keyword in metadata of the video file to associate the keyword with the video file.

12. The information processing apparatus according to claim 9, wherein in the association processing, the processor generates associated data that associates the video file, elapsed time from start of recording the video file to capture for each still image file, and characters included in the character information recognized as characters from an image for the still image file with each other.

13. The information processing apparatus according to claim 9, wherein
the processor further performs keyword extraction processing of extracting a keyword from characters included in the character information acquired by the character information acquisition processing, and
in the association processing, the processor generates associated data that associates the video file, elapsed time from start of recording the video file to capture for each still image file, and the keyword included in the character information recognized as characters from an image for the still image file with each other.

14. The information processing apparatus according to claim 1, wherein the memory further temporarily stores audio data associated with video data received from the other information processing apparatus via the network,
in the capture processing, the processor further captures a screen area of the display configured to display video of the video data and subtitles that are audio data converted into characters, the video data and the audio data being received from the other information processing apparatus and stored in the memory, the captured screen area including a part of displaying the subtitles, the capture processing capturing the screen area that is a still image file at predetermined time intervals, and
in the character information acquisition processing, the processor acquires the character information, which is a part of the subtitles included in at least a part of the images of a series of still image files captured by the capture processing and is recognized as characters, and stores the character information for each image.

15. The information processing apparatus according to claim 14, wherein the processor further performs file generation processing of generating a single data file that collects the character information, in which a part of the subtitles for each captured image acquired by the character information acquisition processing is recognized as a character, in an order of capturing of the images.

16. The information processing apparatus according to claim 14, wherein
in the capture processing, the processor performs the capturing at predetermined time intervals during a period from start to end of recording of a video file in which the video data received from the other information processing apparatus is recorded, and
the processor further performs association processing of associating character information acquired by the character information acquisition processing with the video file.

17. The information processing apparatus according to claim 16, wherein in the association processing, the processor generates associated data that associates the video file, elapsed time from start of recording the video file to capture for each still image file, and characters included in the character information recognized as characters from an image for the still image file with each other.

18. An information processing apparatus comprising:
a memory that temporarily stores audio data received from another information processing apparatus via a network; and
a processor configured to:
execute processing based on the audio data stored in the memory,
perform, at predetermined time intervals, capture processing of capturing a screen area of a display on which subtitles that are based on audio data stored in the memory and recognized as characters are displayed, wherein the captured screen area includes a part of the screen area displaying the subtitles as a still image file; and perform character information acquisition processing of acquiring character information, which is a part of the subtitles included in at least a part of images of a series of still image files captured by the capture processing and is recognized as characters, and storing the character information for each image.

19. The information processing apparatus according to claim 18, wherein the processor further performs file generation processing of generating a single data file that collects the character information, in which a part of the subtitles for each captured image acquired by the character information acquisition processing is recognized as a character, in an order of capturing of the images.

20. A method for controlling an information processing apparatus including: a memory that temporarily stores video data received from another information processing apparatus via a network; and a processor configured to execute processing based on the video data stored in the memory, the method comprising:
- a capture step in which the processor captures, at predetermined time intervals, a screen area of a display on which a video of the video data stored in the memory, wherein the captured screen area includes at least a part of the video as a still image file; and
- while continuing the capture step at predetermined time intervals,
  - a step, in which the processor acquires character information on characters recognized from at least a part of images of a series of still image files captured by the capture step, and stores the character information for each image,
  - a step, in which the processor displays the at least part of the images associated with the character information on the display, wherein in the capture step, the processor compares an image of a still image file captured this time with an image of a still image file captured previously to determine a similarity, and wherein the processor excludes an image of a still image file whose similarity to an image of a still image file captured previously is determined to be equal to or greater than a predetermined threshold from the acquiring of the character information and from the displaying on the display.

21. A method for controlling an information processing apparatus including:
- a memory that temporarily stores audio data received from another information processing apparatus via a network; and
- a processor configured to execute processing based on the audio data stored in the memory, the method comprising:
- a capture step, in which the processor captures, at predetermined time intervals, a screen area of a display on which subtitles that are based on audio data stored in the memory and recognized as characters are displayed, wherein the captured screen area includes a part of the screen area displaying the subtitles as a still image file; and
- a step, in which the processor acquires character information, which is a part of the subtitles included in at least a part of images of a series of still image files captured by the capture step and is recognized as characters, and stores the character information for each image.

* * * * *